United States Patent
Robinson

(10) Patent No.: US 9,922,251 B2
(45) Date of Patent: Mar. 20, 2018

(54) CUED HYBRID ENHANCED SPECTRAL SYSTEM (CHESS)

(71) Applicant: Raytheon Company, Waltham, MA (US)

(72) Inventor: Ian S. Robinson, Redono Beach, CA (US)

(73) Assignee: Raytheon Company, Waltham, MA (US)

( * ) Notice: Subject to any disclaimer, the term of this patent is extended or adjusted under 35 U.S.C. 154(b) by 50 days.

(21) Appl. No.: 15/240,186

(22) Filed: Aug. 18, 2016

(65) Prior Publication Data

US 2018/0053038 A1 Feb. 22, 2018

(51) Int. Cl.
| | | |
|---|---|---|
| G06K 9/00 | (2006.01) |
| H04N 5/33 | (2006.01) |
| G06K 9/46 | (2006.01) |
| G06T 7/00 | (2017.01) |

(52) U.S. Cl.
CPC ......... *G06K 9/0063* (2013.01); *G06K 9/4661* (2013.01); *G06T 7/004* (2013.01); *H04N 5/332* (2013.01); *G06K 2009/00644* (2013.01); *G06K 2009/4657* (2013.01); *G06K 2209/21* (2013.01); *G06T 2207/10036* (2013.01); *G06T 2207/20024* (2013.01); *G06T 2207/30181* (2013.01)

(58) Field of Classification Search
CPC ............... G06K 9/0063; G06K 9/4661; G06K 2009/00644; G06K 2009/4657; G06K 2009/21; G06T 7/004; G06T 2207/10036; G06T 2207/20024; G06T 2207/30181; H04N 5/332
See application file for complete search history.

(56) References Cited

U.S. PATENT DOCUMENTS

| | | | |
|---|---|---|---|
| 5,371,542 A | 12/1994 | Pauli et al. | |
| 6,678,048 B1 | 1/2004 | Rienstra et al. | |
| 6,831,688 B2 * | 12/2004 | Lareau ...................... | G01J 3/02 348/272 |
| 9,213,915 B2 | 12/2015 | Sommese et al. | |
| 2007/0146700 A1 | 6/2007 | Kowarz et al. | |
| 2012/0133775 A1* | 5/2012 | Treado ...................... | G01J 3/32 348/164 |
| 2015/0036941 A1 | 2/2015 | Robinson et al. | |
| 2015/0161768 A1 | 6/2015 | Ardouin et al. | |

(Continued)

FOREIGN PATENT DOCUMENTS

| | | |
|---|---|---|
| WO | 2007098123 A2 | 8/2007 |
| WO | 2015195746 A1 | 12/2015 |

OTHER PUBLICATIONS

International Search Report and Written Opinion from related PCT Application No. PCT/US2017/022140 dated Jun. 19, 2017.

(Continued)

*Primary Examiner* — Shefali Goradia

(74) *Attorney, Agent, or Firm* — Burns & Levinson, LLP; Joseph M. Maraia

(57) ABSTRACT

Described are methods, systems and computer-readable media storing executable instructions for computing, on a per material and per hyperspectrally imaged scene basis, an optimal set of spectrally filtering pass bands for detecting target materials in the scenes, and cueing multispectral imaging of the scenes with the set of pass bands.

24 Claims, 14 Drawing Sheets

(56) References Cited

U.S. PATENT DOCUMENTS

2017/0026633 A1* 1/2017 Riza .................. H04N 13/0235

OTHER PUBLICATIONS

Sheffer, D. et al., "Comparison of Band Selection Results using Different Class Separation Measures in Various Day and Night Conditions", Proceedings of SPIE, vol. 5093, Sep. 24, 2003, pp. 452-461.

Ashton, E.A., "C Evaluation of Multiband Signal-to-Clutter Ratio as a Preforance Metric for Multispectral Detection", http:http://opticalengineering.spiedigitallibrary.org/data/Journals/OPTICE/21855/2618_1.pdf retrieved on Mar. 25, 2014, the whole document; Jan. 1, 1997, pp. 91.

Robila, S.A., et al., "Hyperspectral Data Processing in a High Performance Computer Environment," IEEE International Parallel & Distributed Processing Symposium, 2011, pp. 1424-1431.

Rotman, S.R., et al., "The Impact of Band Selection on Hyperspectral Point Target Detection Algorithms," IEEE 2010, pp. 4761-4763.

Harari Y., et al., "Band Selection in Hyperspectral Images Based on the Fisher Linear Discriminant Classifier," IEEE 26th Convention of Electrical and Electronics Engineers in Israel 2010, pp. 60-62.

* cited by examiner

CUED HYBRID ENHANCED SPECTRAL SYSTEM (CHESS)

BACKGROUND

This disclosure relates generally to the field of image processing, and more particularly to a system and a method for selecting, on a per material and per scene basis, hyperspectral wavebands that are useful for detecting target materials in scenes, and cueing multispectral imaging of the scenes with the useful wavebands.

Detection of smaller, dimmer targets in cluttered scenes using spectral sensors is typically limited by the sensors' ground sample distance (GSD) and ground resolved distance (GRD), to some extent. In conventional hyperspectral imaging (HSI) systems, HSI sensors collect typically 200-400 narrow spectral bands over a given regime (e.g., VNIR/SWIR, LWIR), and routinely use fast focal lengths (e.g., approximately F/3) to provide a balance of signal to noise ratio (SNR) and ground sample distance (GSD), the latter being the dominant term in estimating image quality of a sensor system on the National Imagery Interpretability Rating Scale (NIIRS). While existing HSI sensors are able to extract targets from cluttered imagery using spectral algorithms, they are generally limited to detection of targets having sizes 50-100% of the sensor GSD.

Multi-spectral imaging (MSI) sensors utilizing the same apertures as HSI sensors can offer higher SNR and much finer GSD (e.g., approximately F/12) spanning the same spectral range. However, MSI sensors typically image non-optimal spectral bands and poorly characterize the atmosphere in a scene, and are generally limited to detecting target sizes spanning several GSDs. For example, prior HSI systems generally employ wide spectral band coverage, due to uncertainty whether an appropriate spectral band, or bands, are being used for target detection. Such systems produce panchromatic images, which have less energy per spectral channel, than images produced by MSI sensors.

Imaging systems are typically designed with a tradeoff between the spectral resolution (i.e., the range of wavelengths that are sampled by an imaging detector) and the spatial resolution. Commercial satellites, such as IKONOS and GeoEye, commonly provide three or more relatively coarse resolution MSI bands along with a finer spatial resolution panchromatic band. Panchromatic sharpening, wherein fine spatial resolution panchromatic imagery is merged with higher spectral but lower spatial resolution multispectral imagery to create a single high-resolution color image, is used in some satellite imaging systems. However, such techniques are computationally burdensome, and are not directed to improving resolution or target detection capability.

Thus, there exists a need for methods and systems for enhanced, efficient detection and identification of targets using a single optical telescope imaging a cluttered scene, especially for applications involving long range air and/or space imaging.

SUMMARY

Hyperspectral image (HSI) sensors collect information in hundreds of spectral wavebands. Only a fraction of the information collected is needed to detect a given target. More specifically, given the information represented by a full set of spectral wavebands (bands), a small fraction of the bands contain the majority of useful information for detecting targets using spectral matched filtering (MF) or adaptive cosine estimation (ACE). MF or ACE can be used to detect targets whose size is on the order of a sensor's ground sample distance (GSD) or smaller. Generally, HSI sensors also collect data that enables highly accurate atmospheric characterization and, in turn, conversion of radiance to reflectance and reflectance to radiance. This conversion is important when detecting targets using templates or signatures in an a priori database through techniques such as MF and ACE. MF and ACE are techniques for detecting objects by spectral contrast while simultaneously suppressing the scores of non-target background and clutter. The MF and ACE filter scores for a given target are proportional the product of target area and the target's spectral contrast to the imaged scene background. The selection of each band center and bandwidth can highly influence the spectral contrast.

Multi-spectral imaging (MSI) sensors use many fewer spectral bands. Their spectral bands are usually wide, compared to wavebands of HSI sensors, but their wider spectral bands allow them to have smaller GSDs, while preserving signal to noise ratio. MSI bands can be narrow, if steps are taken (e.g. use of time delay and integration, TDI, etc.) to preserve good signal to noise ratio. MSI sensor data can be used to detect targets through spatial and/or spatial spectral techniques, but MSI sensors generally cannot detect targets smaller than a GSD. MSI sensors also generally do not collect data useful for detailed characterization of the atmosphere.

As few as five (5) and usually no more than twenty (20) hyperspectral "best bands" can typically detect a target 95% the size as may be detected using all the available spectral wavebands. An MSI sensor using these 5-20 best wavebands would have approximately the same ability to detect targets based on spectral contrast as an HSI sensor viewing the same scene. The "best bands" are unique to each target as viewed in a particular scene background, so any fixed or standard set of spectral wavebands applied on an MSI sensor will not achieve the same level of performance as would use of the "best bands". An MSI sensor using the "best bands" will be able to detect targets the size of its GSD or smaller. Since an MSI sensor generally has smaller GSD (3-4×) than an HSI sensor for a given aperture, an MSI sensor using best spectral wavebands can detect a target whose area is ~10× smaller than an HSI sensor.

If MSI and HSI data are collected on the same scene the MSI can be used to both spectrally confirm HSI detections, and to provide "image chips" for analyst or machine assessment of target shape.

As noted, the bands representing the most useful best bands changes from target to target, and from scene to scene. Consider a real-world example of trying to look for a blue tarp in Southern California, which includes urban, suburban, rural, and desert scenes or backgrounds. The blue tarp can be found by detecting spectral contrast (i.e., signature) between the spectrum of the blue tarp and the spectrum of a background including the blue tarp. The contrast, however, differs for each combination of the blue tarp and respective background. For example, the blue tarp against an empty and uniform desert looks, hyperspectrally, different than it would appear in an urban scene background, which may include other blue-colored objects, such as a swimming pools, blue cars or mailboxes.

Accordingly, there is a need to collect and dynamically and adaptively search within a full set of HSI bands for a set of best bands unique to each combination of target and scene, and then use the selected best bands as spectrally filtering pass bands for cueing MSI scans of the scene. Furthermore, there is a need to perform a dynamic and adaptive best band selection that cues tuning of selectable MSI spectral bands to be the best filter pass bands. MF and/or ACE may be applied to this collected MSI data while using the characterization of the atmosphere from the HSI sensor.

Systems and methods are disclosed for improved detection of small, dim targets at long range for given telescope aperture by cueing a tunable MSI sensor with small GSD with information gathered from a HSI sensor of much coarser GSD. The MSI sensor and HSI sensor may be co-located behind a common aperture for improved performance, although this is not essential. The exemplary embodiments enable detection of targets too small for reliable detection using HSI alone. The HSI sensor will generally have much coarser GSD than the MSI sensor, and thus spectral covariance may be slightly (and negligibly) different. However, in contrast to the MSI sensor, the HSI sensor can both detect (some) targets and permit measurement of background scene spectral covariance and atmospheric characterization. In one exemplary embodiment, a standard (fast F#) HSI sensor (e.g., 200 spectral wavebands) may scan a scene, trailed by a scan by an MSI sensor sharing the same aperture and having a much slower F number (i.e., smaller pixels). HSI signal processing may be used to establish background statistics from which a number of optimal spectral wavebands for target detection may be computed, and to explicitly detect targets using a spectral library. A low detection threshold may be employed, which could lead to some marginal detections that actually represent scene image clutter or noise. A subset of useful HSI filter pass bands (e.g, 5-20 bands) may be computed by applying a filtering process for targets associated with any marginal detections. Tunable optical filters may then be cued to apply the computed pass bands to the MSI sensor. In alternate embodiments, the MSI filter pass bands may be optimized to detect a single target, or a mix of targets, etc. The techniques described herein, in essence, transfer the spectral clutter rejection efficiency of HSI to an MSI sensor with much smaller GSD, thereby enabling it to detect much smaller targets (versus multi-pixel for MSI alone). This is an advantage over prior MSI sensors having fixed spectral bands that do not, generally, enable sub-pixel target detection, due to poor clutter rejection and poor atmospheric characterization.

In one embodiment, a method is provided for detecting a target within a scene with HSI and MSI sensor. One or more processors may be employed to receive HSI scene data that includes an array of scene pixels collected in a set of spectral wavebands available to an HSI sensor. Atmospheric transmission and path radiance may be characterized from the HSI scene data, on the HSI scene data. The N best spectral passbands are computed based on the spectra for the particular target and the statistical characterization of the scene using the HSI data. The term "best" refers to a selection of a sub-set of spectral passbands that collectively provide the majority of information separating the target from the background as measured using signal to clutter ratio. A subset of bands may also be selected to detect a plurality of targets with "best" signal to clutter ratio averaged over the plurality of targets. The phrase "best" spectral pass bands is used interchangeably herein with the novel intended use of the bands as MSI filter pass bands, although the bands are derived based on the HSI scene data. The number of spectral pass bands, N, could be for example, between 5 and 20, while the available set of HSI bands could be an order of magnitude greater, or more. A number of techniques may be employed to compute the N best bands, which may then be used to command N tunable optical filters (TOFs) operably connected to the MSI sensor to tune to the NMSI filter pass bands. The TOFs may comprise rapidly switching filters, such as liquid crystal filters, mechanical filters, MEMS filters, etc. The MSI sensor may share a common aperture with the HSI sensor. The tuned TOFs are applied to the MSI sensor, which acquires radiance of the scene. The acquired MSI scene radiance may be converted into a MSI reflectance using the characterization of the atmospheric transmission and path radiance from the HSI scene data. One or more target detection filters may be applied to the acquired MSI scene reflected in order to detect one or more targets.

In another embodiment, the prioritized list of targets may be computed by determining whether the target(s) is/are detectable in the HSI scene data by comparing HSI target detection score(s) to a threshold by applying MF or ACE based on known target spectra within the HSI scene pixels. For each HSI target detection score detected above the threshold, the set of HSI wavebands may be filtered, using the computed spectral covariance, to compute the NMSI filter pass bands, which will comprise a reduced set of N HSI wavebands having an acceptable signal-to-clutter ratio (SCR) representing a probability of detecting the target(s) in the HSI scene data. If a target is detected in the HSI scene data, the TOFs may be tuned and one or more target detection filters may be computed. The target(s) may then be detected in the acquired MSI scene reflectance by computing N-band MF or ACE scores for each target having a MSI target detection score above a threshold using the characterized atmospheric transmission and path radiance and the N-band MSI scene reflectance, in order to confirm the detection of the target(s). In certain embodiments, the MF and/or ACE scores associated with MSI scene reflectance for each detected target may be combined, weighted by a computed efficiency for the filter combination associated with a respective target and covariance.

If no HSI targets are detected, the selection of the list of prioritized targets may involve assigning the NMSI filter pass bands to be MSI wavebands associated with one or more targets selected from a (e.g. prioritized) spectral library.

In another embodiment, the N MSI filter pass bands may be selected to detect multiple targets based on at least one of an average of computed SCR levels. The multiple targets may each be of a threshold size.

In yet another embodiment, the N MSI filter pass bands may be computed by computing a spectral covariance of the scene pixels using HSI scene reflectance, and filtering, using the computed spectral covariance, the set of available HSI wavebands to compute the N MSI filter pass bands as a reduced set of N HSI wavebands having an acceptable SCR representing a probability of detecting in the scene one or more prioritized targets in the spectral library. Similarly, the N MSI filter pass bands may be computed to detect multiple targets based on at least one of an average of computed SCR levels.

In another embodiment, detection of multiple targets may be attempted, and the N MSI filter pass bands may be computed such that the best bands comprise subsets of bands, where each subset of bands is computed to detect one of the multiple targets.

In another embodiment, the tunable-filtered MSI sensor produces image chips for assessment of a corresponding one or more shape of the detected one or more targets.

In another embodiment, detecting the target(s) within the acquired MSI scene reflectance may comprise applying time delay and integration to the MSI scene data in order to increase an associated signal to noise ratio of the MSI scene data.

In a further embodiment, after detecting a first target with the MSI sensor tuned to a first set of wavebands comprised of some or all of the N MSI filter pass bands, the MSI sensor may be returned through the TOFs to a second set of MSI filter pass bands, or subset thereof, in order to detect one or more additional target(s).

In another implementation, a system may be provided for detecting a target within a scene with HSI and MSI sensors, where the system include one or more processors (e.g., an image processor, etc.) that is configured to perform some or all of the methods described above.

In yet another implementation, a non-transient computer readable medium may be provided having stored therein program instructions that, when executed by one or more processors, cause the processor(s) to detect a target within a scene with HSI and MSI sensors according to any of the methods described above.

BRIEF DESCRIPTION OF THE DRAWING

The foregoing and other objects, features and advantages will be apparent from the following, more particular description of the embodiments, as illustrated in the accompanying figures, wherein like reference characters generally refer to identical or structurally and/or functionally similar parts throughout the different views. The figures are not necessarily to scale, emphasis instead being placed upon illustrating the principles of the embodiments, wherein.

DETAILED DESCRIPTION

Figure 1:
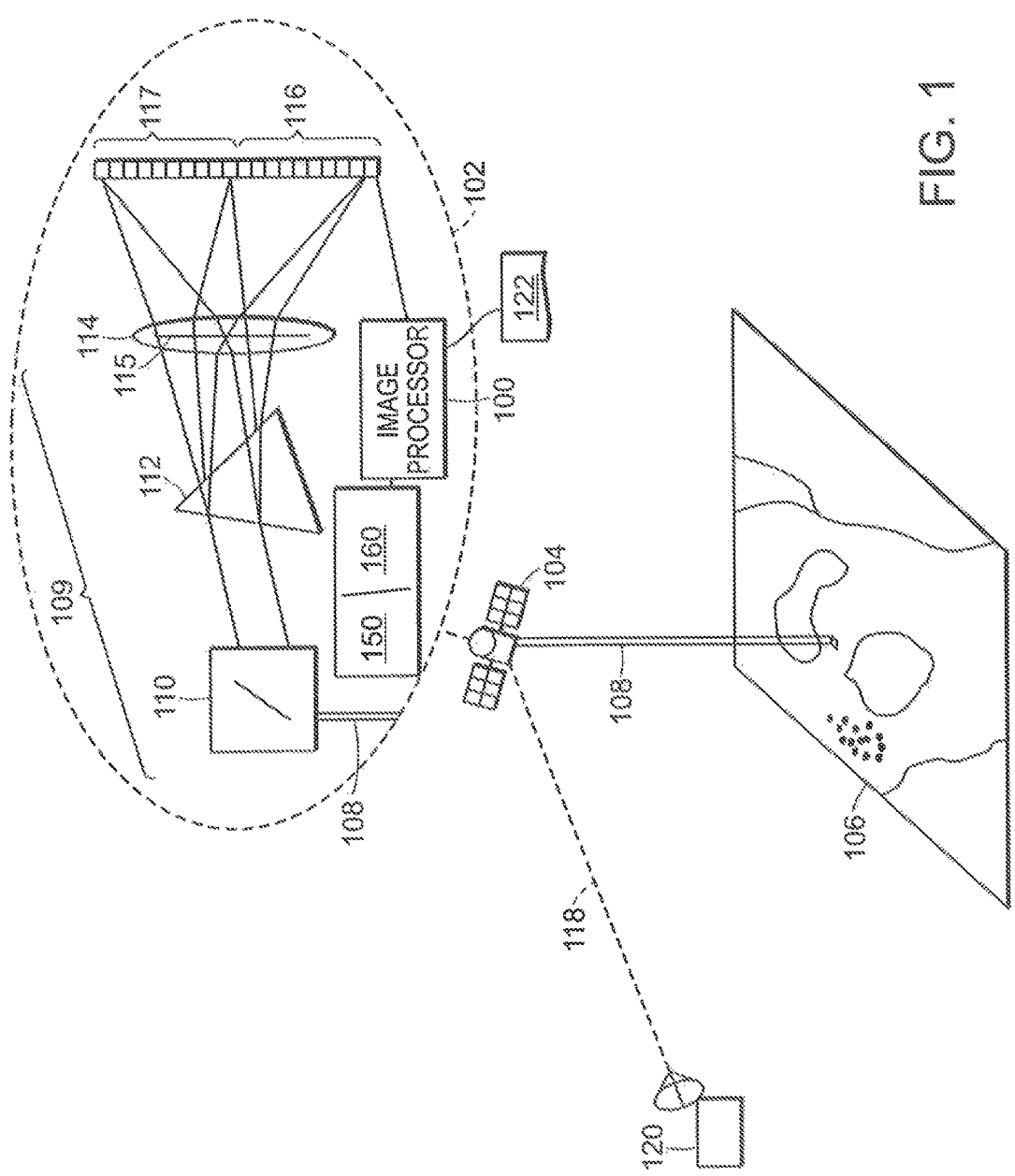
FIG. 1 is a block diagram of an example imaging system with a cueing module and detecting module.

In the description that follows, like components may be given the same reference characters, regardless of whether they are shown in different examples. To illustrate an example(s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples. The terms "bands", "spectral bands" and "wavebands" are used interchangeably in the following description, and references to "best" bands generally refer to the subset of spectral pass bands computed from data acquired by a hyperspectral imaging (HSI) sensor and used as filtering pass bands to cue data collection by a multispectral imaging (MSI) sensor.

Depicted in FIG. 1 is an example of imaging system 102 that is configured to process images and to detect materials and targets in backgrounds and scenes. The implementations described below are particularly useful in anti-access/area denial environments, where it is more important to have sensors that can operate passively, especially at long range, to help detect and identify targets in clutter, especially at long range for air/space sensors, and targets too small for reliable detection using HSI alone. There are several denied regions where the military or intelligence communities require detection and identification of very specific materials and/or targets that only appear in quantities that can be detected using the implementations described herein. The systems and methods provided herein use real-time collection of HSI data to reject spectral clutter introduced by the atmosphere, which usually results in large ground sample distance (GSD), and to cue MSI equipment to exploit finer GSD. In certain embodiments, spectral bands optimized for a target given a measured background are applied to tunable optical filters (TOFs) operably connected to an MSI sensor for image acquisition. The disclosed techniques maximize signal to clutter ratio (SCR) for the MSI sensor(s), and advantageously enable detection of much smaller targets than achievable by MSI alone.

By way of example only, imaging system 102 may comprise a HSI detector array 116 and a MSI detector array 117. The term "hyperspectral" may refer to imaging in a large number of narrow (e.g., 5-15 nm wide) spectral bands over a contiguous spectral range, and producing the spectra of all pixels in a scene (e.g., scene 106), while "multispectral" refers to imaging in a relatively small number of discrete bands. Imaging system 102 may be stationary or mobile, airborne or land based (e.g., on an elevated land structure or building), or may be on an aircraft or a satellite. As shown, imaging system 102 may incorporate image processor 100, and may be coupled to or otherwise contained within remote imaging system 104. Remote imaging system 104 may be of any suitable construction or configuration, including but not limited to comprising a satellite, an aerial surveillance system, or any other system that can capture images. Additionally, remote imaging system 104 may be stationary or mobile, airborne or land based (e.g., through transmission 118 to a remote station 120 located on an elevated land structure or building), or may be configured on an aircraft or a satellite. In an example, imaging system 102 and remote imaging system 104 may be configured to capture one or more images of a particular scene 106 corresponding to a geographical area (e.g., a ground terrain).

Remote imaging system 104 may be configured to use imaging system 102 to capture hyperspectral image(s) of scene 106 that are provided as input HSI scenes to image processor 100. In an example, HSI detector array 116 and a MSI detector array 117 may share a common aperture 109, comprising a number of optical components. One or more scan mirrors 110, or other optics, may be arranged to receive light 108 reflected from one or more ground resolution cells.

Light 108 reflected from one or more ground resolution cells, and generally the entire scene 106, may be used by image processor 100 to determine an input reflectivity of the input scene, and convert the radiance to reflectance through atmospheric compensation. The input scene may be a part of scene 106, or may be the entire scene 106 depending upon specific target detection goals. In an example, scan mirrors 110 or the other optics may then direct light 108 through dispersing element 112, which may be arranged to separate light 108 into various different wavelengths (i.e., a spectra).

After being separated into the various different wavelengths, light 108 may then be directed to one or more imaging optics 114, which may include one or more TOFs 115 receiving input commands from image processor 100. Imaging optics 114 may focus the various wavelengths onto a focal plane of HSI detector array 116 or MSI detector array 117. TOFs 115 may comprise up to N rapidly switching filters, such as liquid crystal filters, pixel-level Fabry-Perot, mechanical filters and/or MEMS filters.

Figure 2:
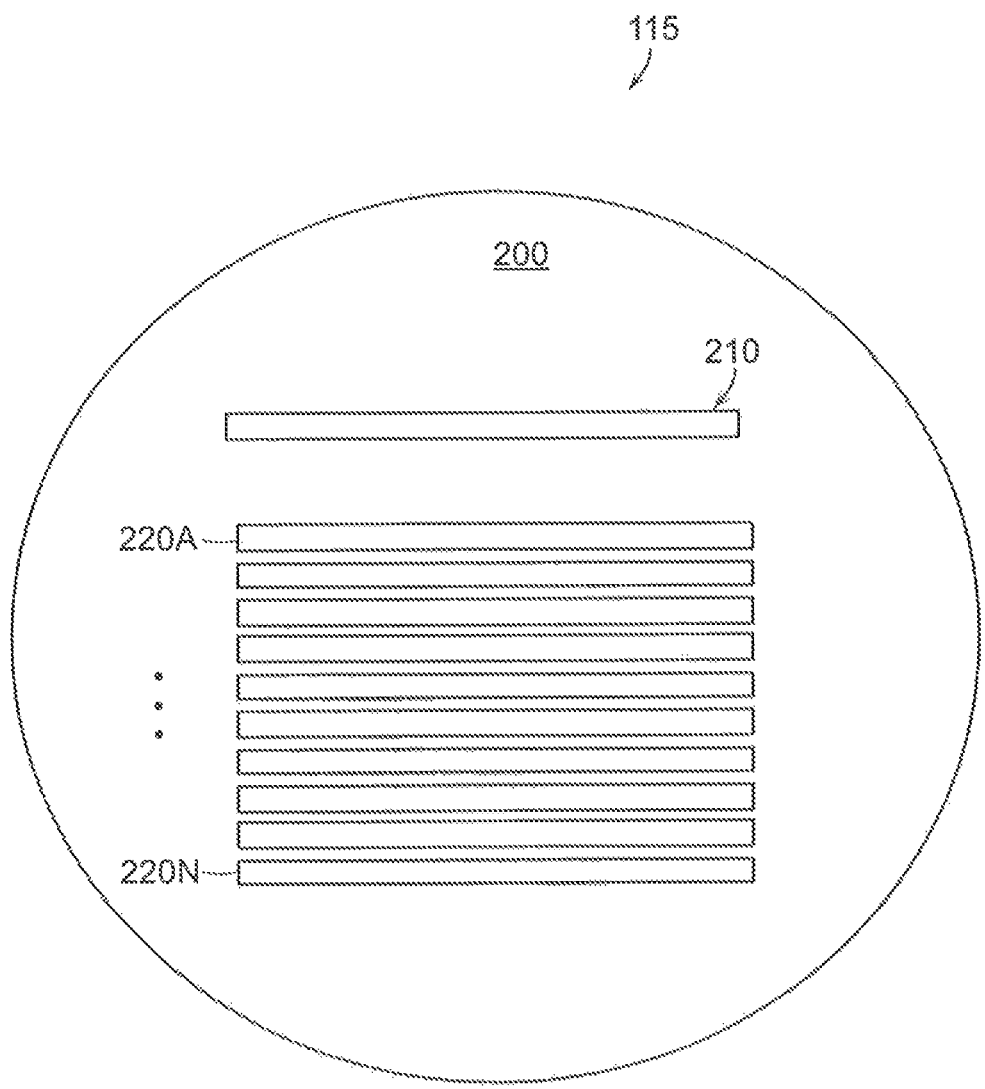
FIG. 2 is an illustration of an optical element including a tunable filter.
Figure 3:
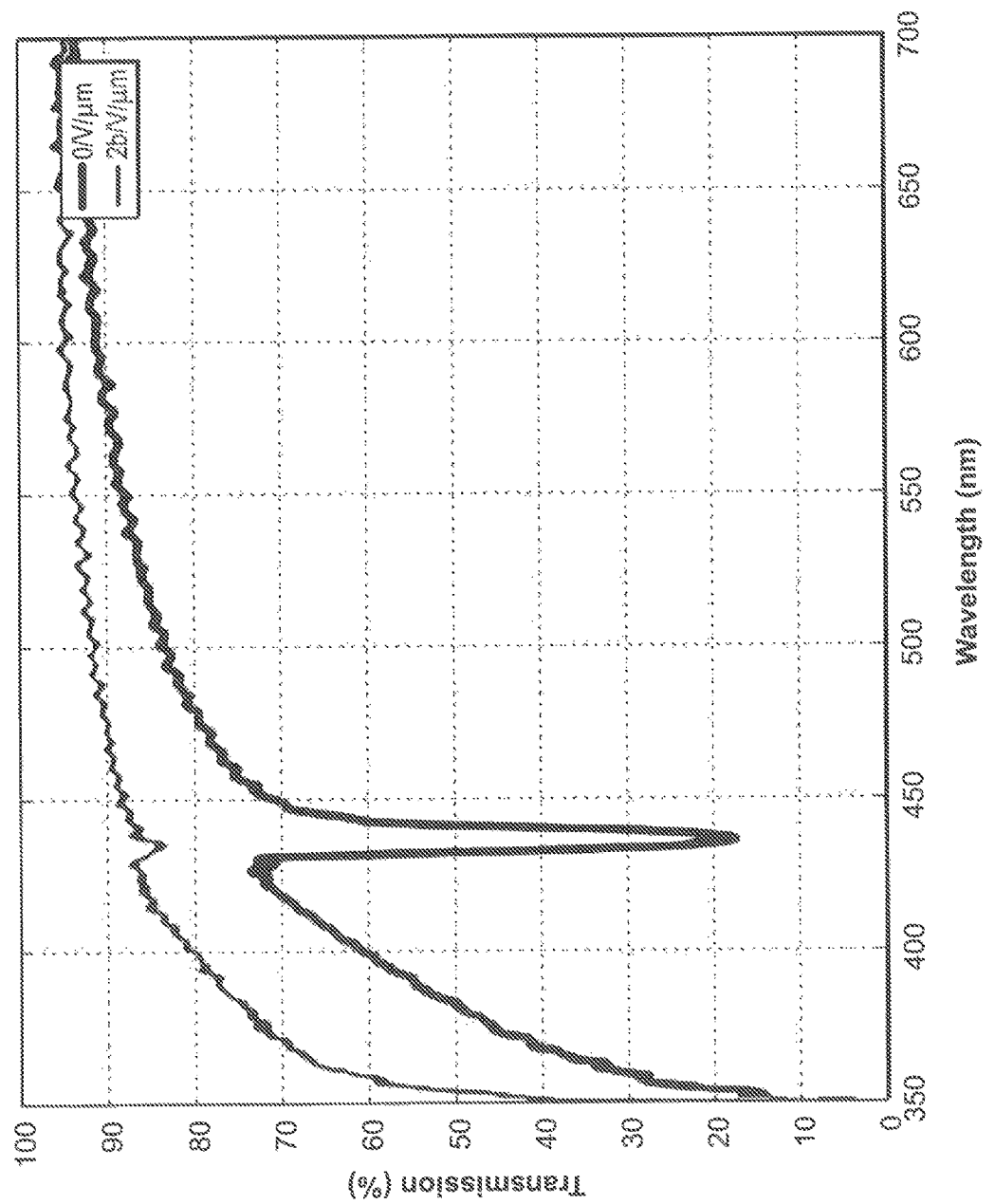
FIG. 3 is a graph of spectral transmission demonstrating operation of a tunable optical filter.

An example TOF 115 is illustrated in FIG. 2. TOF 115 may comprise a single optical element 200 configured with an optical slit 210 for transmitting HSI radiation (across a full set of available spectral wavebands) to the HSI detector array 116, and N spectral bandpass regions 220A-220N configured to transmit scene radiation to the MSI detector array 117 in N spectral bands (e.g., in the "best" filter pass bands computed as described below.) Examples of suitable TOFs include liquid crystal tunable filters such as available from Drexel University (Philadelphia, Pa.), Thorlabs Inc. (Newton, N.J.), and PerkinElmer Inc. (Waltham, Mass.), and described by Beeckman et al., "Liquid-crystal photonic applications", Optical Engineering 50(8), 081202 (August 2011). Generally, liquid crystals materials are comprised of layers of molecules that align when an electric field is applied to them. When the field is applied, the liquid crystal molecules rotate and a refractive index difference that forms a Bragg grating structure that reflects the Bragg wavelength when no field is applied disappears, making the filter transparent (e.g., such as shown in FIG. 3.)

Figure 4A:
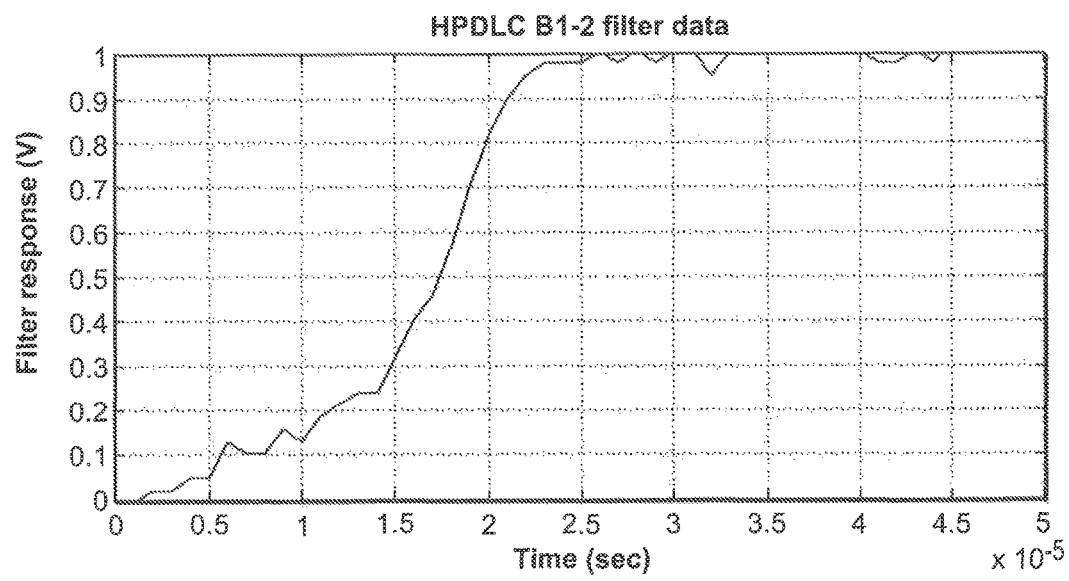
FIGS. 4A and 4B are graphs illustrating example switching times of optical filters.
Figure 4B:
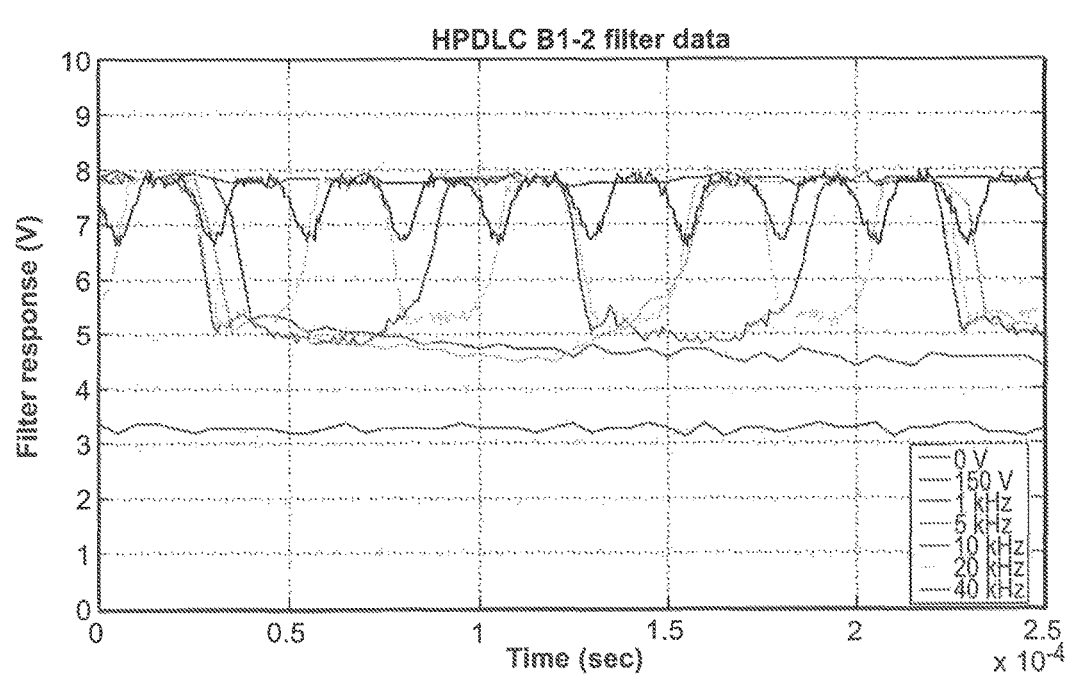
Figure 5A:
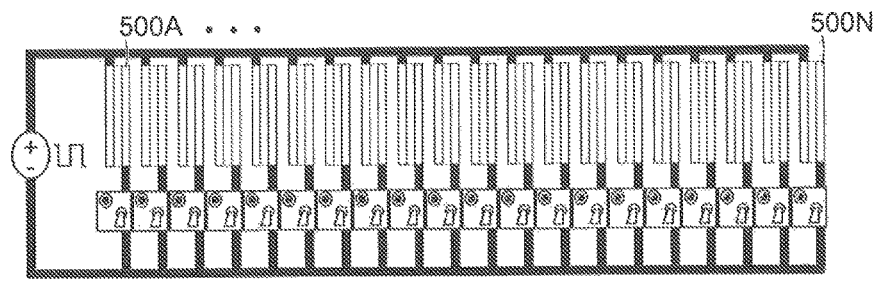
FIG. 5A is an illustration of a stacked optical filter, 5B and 5C are graphs illustrating optical performance of an example stacked tunable optical filter.
Figure 5B:
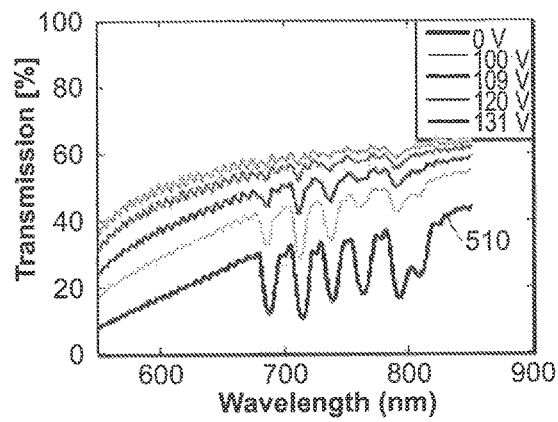
Figure 5C:
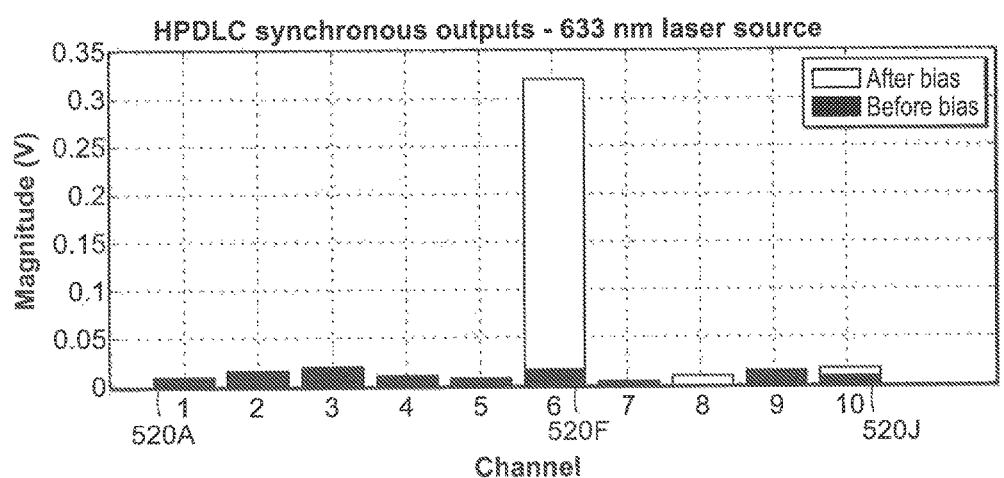

FIGS. 4A and 4B illustrate exemplary liquid crystal TOFs response times, demonstrating that TOFs 115 constructed with such materials may achieve fast (e.g., <20 microseconds) filter switching. The switching time is dependent on the physical dimensions of the liquid crystal layers, and the applied electric field. With reference to FIG. 5A, multiple liquid crystals filters 500A-500N may be fabricated into a single stack. Each of the liquid crystals filters 500A-500N may be individually controlled, in order to operate in band pass, band rejection, or any other customizable mode. FIG. 5B illustrates an exemplary six-layer stack, with all filters being switched simultaneously (plot line 510.) FIG. 5C illustrates optical detection through a ten-layer stack, with each filter output 520A-520J associated with a unique filter being switchable at a unique spectral frequency. Filter output 520F reflects radiation at 633 nm, using a HeNe laser source.

Thus, detector array 116 may capture HSI data across the spectrum of wavelengths, and any target detections within the HSI data may be used in cueing detector array 117 to capture MSI data tuned to a selected subset of wavebands, thereby generating higher SCR MSI data sets for use in more efficiently identifying targets within scene 106 and in smaller sizes than previous approaches using HSI or MSI alone.

Referring again to FIG. 1, image processor 100 may include processing modules, such as cueing module 150 and MSI detecting module 160 for detecting a target in a scene, such as a material against a background, using both HSI and MSI imagery. HSI sensors typically collect 200-400 narrow spectral bands over a given sensing regime (e.g., visible, near infra-red (VNIR), and short wave infrared (SWIR). It may not be practical for the image processor 100 to process this amount of information, especially when the cueing module 150 and MSI detecting module 160 are located "on-board" the remote imaging system 104, as shown in the figure. It may also not be practical to process this amount of information "on-ground." Ground stations are not able to process total daily collections in excess of several terabytes per day.

The use of a reduced set of spectral bands has a side effect of reducing the amount of HSI and MSI information processed by the image processor 100. Often for a given target in a specific scene (referred to as a target/scene pair or material/background pair), there are 5-20 wavebands that contain over 90% of the useful information. Accordingly, cueing module 150 and MSI detecting module 160 may select subsets (e.g., N filter pass bands) of HSI and MSI wavebands having information useful for detecting targets in scenes. These informative bands may be referred to interchangeably herein as the N best spectral wavebands or MSI filter pass bands. The N best bands, a subset of the original HSI wavebands, may be used to cue the N TOFs 115 such that the MSI detector array 117 generates MSI data only in the N filter pass bands. Those of skill in the art will recognize that cueing module 150 and MSI detecting module 160 are merely functional block to aid in understanding, and image processor 100 may implement the methods described herein using a variety of logical configurations, on a single processor, and/or in a distributed processing configuration.

Figure 6:
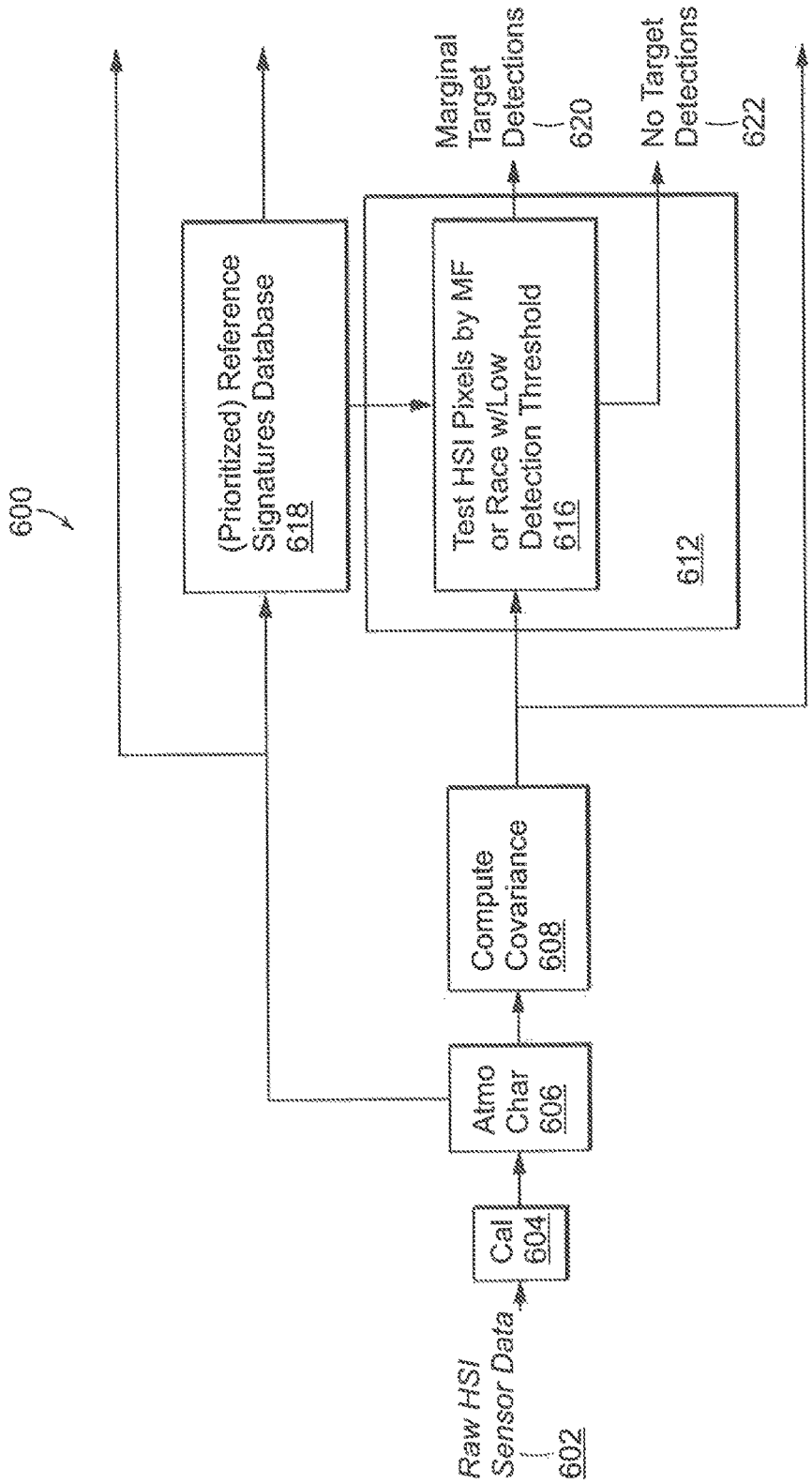
FIG. 6 is a block diagram of an example of the hyperspectral imaging (HSI) cueing module and process.

FIG. 6 shows an example process 600 of the cueing module 150 for initially processing the input scene of raw HSI sensor data 602 acquired by HSI detector array 116 (as shown in FIG. 1). The HSI input scene may comprise a plurality of scene pixels. (A scene pixel can also be referred to as "spatial pixel" or simply "pixel," all of which may be used interchangeably herein.) Each scene pixel may have an associated spectral vector containing one or more spectral measurements representing energy associated with its pixel. The cueing module 150 (shown in FIG. 1) may optionally convert the raw HSI sensor data 602 from a radiance into a reflectance (using Cal module 604). Cueing module 150 may estimate atmospheric transmission and path radiance from the HSI sensor data 602, at atmosphere characterization module 606 using known atmospheric characterization techniques, such as described in "Atmospheric correction algorithms for hyperspectral remote sensing data of land and ocean", B.-C. Gao et al., Remote Sensing of Environment 113 (2009) S-17-S24, "Comparison of ATREM, ACORN, and FLAASH Atmospheric Corrections Using Low-Altitude AVIRIS Data of Boulder, Colo.", F. A. Kruse, Proceedings of 13th JPL Airborne Geoscience Workshop, Pasadena, Calif., USA, 31 Mar.-2 Apr. 2004, "Speed and Accuracy Improvements in FLAASH Atmospheric Correction of Hyperspectral Imagery, T. Perkins et al., SPIE Optical Engineering, Vol. 51(11), 111707 (2012), and/or "Atmospheric Correction of Spectral Imagery: Evaluation of the FLAASH Algorithm with AVRIS Data", M. W. Matthew et al., Applied Imager Pattern Recognition Workshop, 2002, Proceedings $31^{st}$, the contents of each of which are incorporated herein by reference in their entirety.

Cueing module 150 may then compute (using covariance computation module 608) the respective spectral covariance matrix of the scene pixels using the HSI sensor scene data 602, describing the natural variation of spectra in the scene (the scene clutter).

In HSI detector module 612, HSI sensor data 602 is tested for the presence of a target using a detection filter with spectra selected (automatically or by an operator) from, for example, a prioritized spectral database 618. Spectral database 618 may comprise a prioritized group of known targets' spectra. Detecting a target may involve using one or more of the retrieved, known, unique spectrum or "signature" associated with a target. A common form of target detector is the spectral Matched Filter (or "MF") target detection filter. A matched filter score or "score" may be computed for the HSI pixels using the unique spectrum of the spectral reference, according to Eqn. 1, $$MF = \frac{(s-\mu_b)^T \sum_b^{-1} (x-\mu_b)}{(s-\mu_b)^T \sum_b^{-1} (s-\mu_b)} \quad \text{Eqn. 1}$$

where s represents a known target signature spectrum, x represents the pixel spectrum, $\mu_b$ the scene mean background, and $\Sigma_b$ the computed covariance matrix.

Comparison module 616 may also use known Adaptive Cosine/Coherence Estimator (ACE) techniques for computing a target score for the HSI pixels, using the target detection score formula:

$$ACE = \frac{\left[(s-\mu_b)^T \sum_b^{-1} (x-\mu_b)\right]^2}{(s-\mu_b)^T \sum_b^{-1} (s-\mu_b)(x-\mu_b)^T \sum_b^{-1} (x-\mu_b)} \quad \text{Eqn. 2}$$

Presence of a target typically is associated with a high detection filter score. HSI detector module 212 may purposely employ a low detection threshold (e.g., a SCR value>than 2, rather than a higher value such as 6). This may result in a higher number of "marginal" detections, which may include number of false detections, but ultimately enables the detection of smaller targets (e.g., ⅓ of the size as higher detection thresholds), as the marginal detections are useful in prioritizing the list of targets for which the N MSI passbands are found, and their use in MSI facilitate finding smaller targets. HSI detector module 612 may output scores for any target detections (including marginal target detections) and the wavebands associated with the marginal detections 620, or an indication 622 that no targets were detected in the processed HSI wavebands.

Figure 7:
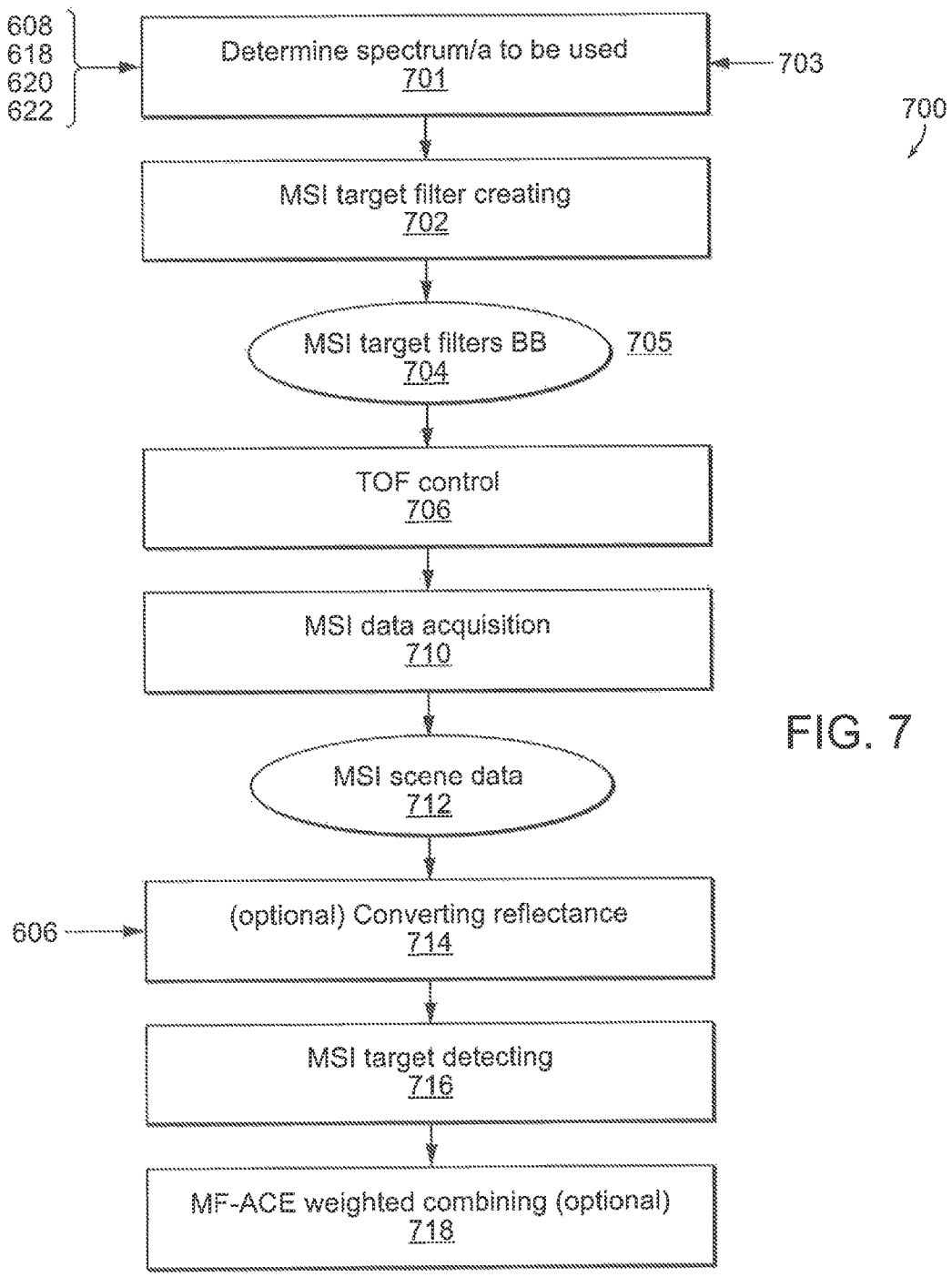
FIG. 7 is a block diagram of an example MSI detecting module and process.

FIG. 7 is a flowchart illustrating an overview of a process 700 that may be performed by MSI detecting module 160 of imaging processor 100 (both shown in FIG. 1), after target detection in the HSI sensor data 602 has been attempted, such as illustrated in FIG. 6. In component 701, process 700 receives from process 600 the information needed to compute the best MSI filter pass bands (e.g., information from modules 608, 618, 620, and 622). The selection of filter pass bands may be operator defined (e.g, the top spectrum from spectral database 618, the top M spectra from spectral database 618, a spectrum or spectra with marginal detections 620, etc.) Process 700 may receive from HSI detector module 612 the target(s) detection information 620 and/or indication 622 that one or more targets were not detected in the processed HSI wavebands, and known spectral information (e.g., known target spectra) for one or more targets from spectral library 618. MSI target filter module 702 may then compute the best N MSI filter pass bands 704 based on HSI scene data, the computed spectral covariance of the scene pixels, and the target detection information 620, if any targets were detected.

If targets were detected (i.e., resulting output scores computed were above the detection threshold) by HSI detector module 612, then for each of the detections, MSI target filter module 702 may apply a number of techniques for computing the N MSI pass bands 704. Several exemplary techniques that are in no way intended to limit the present best band computation process will be described in greater detail in the following section, and are at least in part based on the inventor's prior work, as described in U.S. Pat. No. 9,213,915, issued Dec. 15, 2015, entitled "Sparse Adaptive Filter", the contents of which are herein incorporated by reference. In one embodiment, a filtering process may be applied using the computed spectral covariance(s) to the full set of available HSI wavebands associated with the detection. This may result in computation of a reduced set of N MSI pass bands 704 having an 'acceptable' signal-to-clutter ratio (SCR) representing a probability of detecting the target(s) in the HSI sensor data 602. An "acceptable" SCR may be selectable, such that the N MSI pass bands 704 computed comprise an intersection of the best N bands for detecting multiple targets each associated with a SCR above a selected threshold (e.g., wherein a user can input a target size.) The imaging system, thus, may be used to search for and detect larger targets using the HSI sensor, and then to perform automated or manual identification using the fine resolution MSI that spans the same spectrum (or at least provide many times finer color context imagery.)

Exemplary Filtering Technique

Inputs 703 to the spectrum (or spectra) determination module 701 may include a target reference vector, process control parameters, and "acceptability" criteria. The acceptability criteria may comprise, for example, the specified number N of wavebands, a specified SCR or a specified fraction of the total SCR for the full set of wavebands. The acceptability criteria may be provided by a user to the detecting module 160 (e.g., via with a user interface element communicative coupled to or part of the detecting module 160). The acceptability criteria may be provided in response to particular application or mission. For example, when the mission is to find particular vegetation, the detecting module 160 may be provided with a first acceptability criterion. When the mission changes to find explosives, the detecting module 160 may be provided with a second acceptability criterion different than the first. Differences in acceptability criterion from one application to another may reflect the different criticality of the applications.

The N MSI pass bands 704 output by MSI target filter module 702 may be computed for particular material/background (or target/scene) pairs. The MSI target filter module 702 may use a layered approach to selecting the optimal pass bands tailored to the particular material/background (or target/scene) pair.

Figure 8:
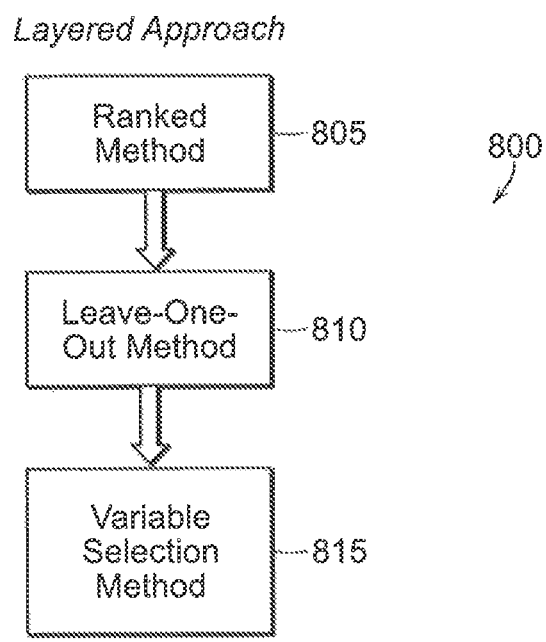
FIG. 8 is a block diagram of an example of a layered approach employed by the HSI cueing module of FIG. 6.

FIG. 8 shows an example of a layered approach 800. The layered approach 800 includes a ranked search technique 805, leave-one-out search technique 810, and variable search technique 815. The search techniques 805, 810, and 815 are said to be layered because the output of one search technique is the input to a next search technique. Layering the search techniques brings computational efficiency to band selection. Each subsequent search technique is "better" at selecting bands but at the expense of more computations. For example, in convenient example of the layered approach 800, the first two search techniques, ranked and leave-one-out, are designed to quickly remove bands that are not useful (i.e., with little or no information) for detecting targets in scenes. The result is a manageable subset of bands that can be supplied to the final, variable search technique for optimal selection of bands.

Figure 9:
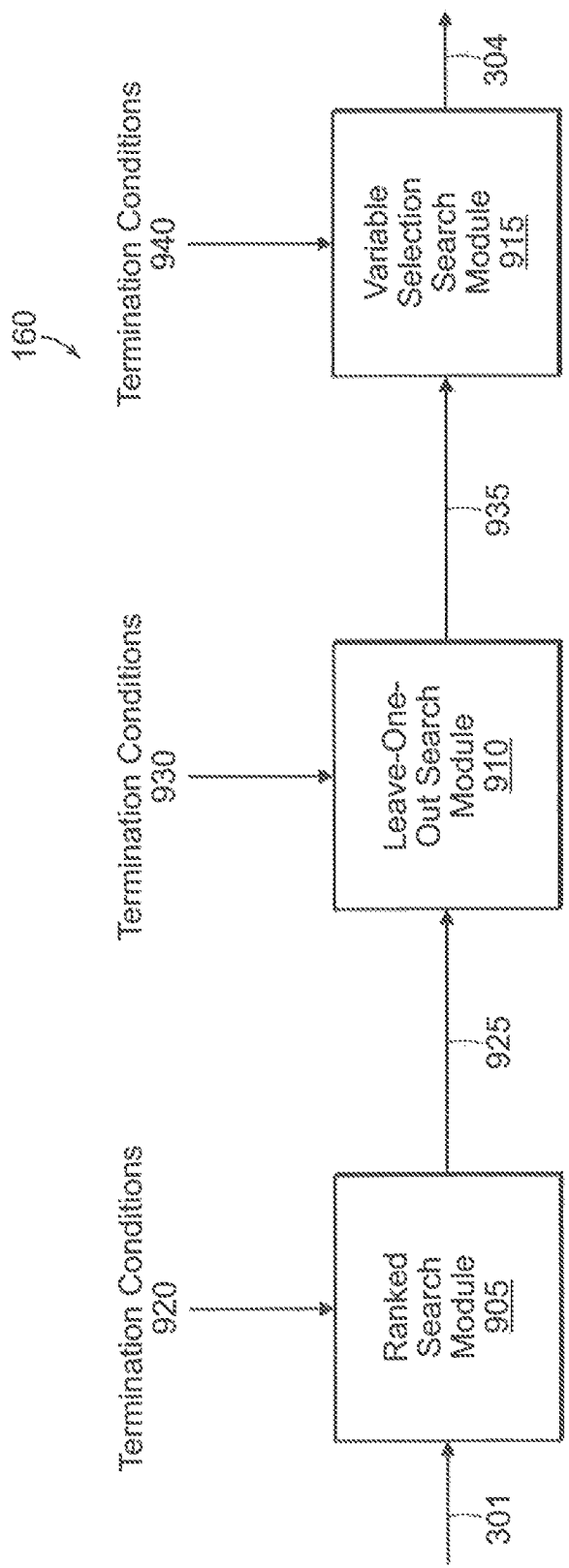
FIG. 9 is a block diagram of an example MSI tunable filter generating module.

With reference to the example shown in FIG. 9, the detecting module 160 may include a ranked search module 905 implementing the ranked search technique 805, a leave-one-out search module 910 implementing the leave-one-out search technique 810, and a variable search module 915 implementing variable search technique 815. The modules 905, 910, and 915 may be communicatively coupled to one another as shown.

In operation of a convenient example of the MSI target filter module 702, the ranked search module 905 uses normalized matched filter weights calculated in full spectral dimensions to quickly eliminate wavebands that are not useful for detection. The ranked search module 905 may receive inputs 703 (e.g., for the image processor 100 of FIG. 1), including a full set of wavebands for a particular material/background (or target/scene) pair and an associated SCR (full band SCR). The ranked search module 905 may also receive termination conditions 920 including a "good enough" condition for the ranked search technique 805. (The good enough condition is described in greater detail below.)

The ranked search module 905 may calculate normalized weights by multiplying the matched filter weights in each wavelength by the standard deviation for that wavelength.

$$W_{MF} = \sum_{b}^{-1} (s - \mu_b),$$ Eqn. 3 where $W_{MF}$ are the matched filter weights and where $s$ = known target spectrum $\mu_b$ = mean background $\sum_{b}$ = covariance matrix $$W_N = \begin{bmatrix} \sigma_1 & 0 & 0 \\ 0 & \ddots & 0 \\ 0 & 0 & \sigma_n \end{bmatrix} \cdot W_{MF},$$

where $W_N$ are the normalized weights and $\sigma_i$ are the standard deviations of the bands.

This has the effect of equalizing the importance of each waveband. Without normalization, a waveband with a large variance in the background scene is given too small a weight after multiplying by the inverse covariance. This may lead to undesirable or erroneous results. Normalizing by multiplying by the standard deviation results in a more appropriate contribution from bands with large or small scene variance.

Once the weights are normalized, the ranked search module 905 may rank them by importance, e.g., ones with larger magnitudes are deemed more important. The ranked search module 905 may remove lower ranked bands until the "acceptability" condition is satisfied, e.g., a desired number of bands is reached. The goal of the ranked search technique 805 is not to select the "best" bands, but to reduce the initial set of bands to a more computationally manageable number for the next level of selection. Therefore the ranked search technique 805 may be designed to reject non-informative bands with very little computational overhead. The ranked search module 905 may pass an intermediate output 925, including the remaining bands as a reduced band set for the particular material/background pair and an associated reduced SCR to the leave-one-out search module 910.

The leave-one-out search module 910 may receive the intermediate output 925 and termination conditions 930 including an "acceptability" condition for the leave-one-out search technique 810. The leave-one-out search module 910 iteratively removes the least-informative band until the good enough condition is satisfied, e.g., a desired number of bands is reached.

The leave-one-out search module 910 may remove the band with the smallest normalized weight and then recompute the weights with the remaining bands, and repeating the process. The computational expense is equivalent to taking the inverse of a matrix that is the dimension of the initial number of bands passed to this layer. The leave-one-out search module 910 may pass an intermediate output 935, including the remaining bands as a reduced band set for the particular material/background pair and an associated reduced SCR to the variable search module 915.

The variable search module 915 may receive the intermediate output 935 and termination conditions 940 including an "acceptability" condition for the variable selection search technique 815. The variable search module 915, at any point in its search, adds a band that produces the highest signal-to-clutter ratio (SCR) in conjunction with the bands already selected. The variable search technique 815 is an example of a "greedy" algorithm that has the possibility of become trapped in a local minimum. The variable search module 915 reduces the possibility of this occurring by "backtracking" When the variable search module 915 adds a new band, the variable search module 915 attempts to replace previously selected bands to improve the SCR. The variable search module 915 produces the MSI target filters 704, including a reduced set of bands for the particular material/background pair and an associated reduced SCR.

While the variable search technique 815 is computationally efficient relative to similar classes of search techniques, the variable search technique 815 is computationally intensive relative to the ranked search technique 805 and leave-one-out search technique 810. Accordingly, in practice, the variable search technique 815 is used to pick a small subset of bands from a manageable initial subset found by the proceeding search techniques.

While the MSI target filter module 702 is described implementing all three search techniques, each search technique may be executed by itself to perform band selection. As such, other examples of the MSI target filter module 702 may include a fewer number modules (including 1) executing a fewer number of search techniques (including 1). Having described the search techniques 805, 810, and 815 in the context of an example of the layered approach 800, as carried out by the MSI target filter module 702, each search technique and its examples are described in greater detail below.

Figure 10:
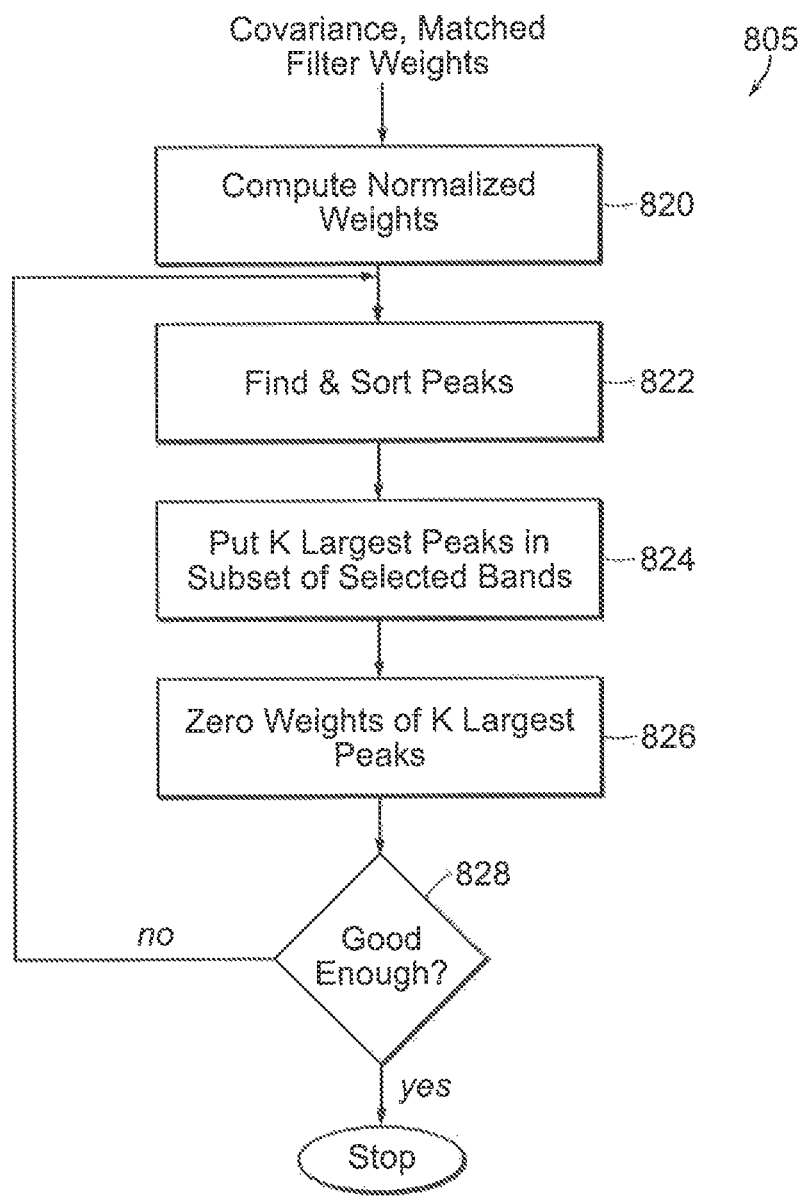
FIG. 10 is a flow chart of an example of a ranked search technique.

FIG. 10 shows an example of the ranked search technique 805 executed by the ranked search module 905 (as shown in FIG. 9). The ranked search module 905 may compute normalized weights (820). For example, the ranked search module normalizes (820) the weights by multiplying matched filter weights in each wavelength by a standard deviation for that wavelength. Normalization has the effect of equalizing the importance of each band.

After weight normalization (820), the ranked search module 905 may find and sort (822) K largest peaks in magnitude space and adds (824) them to a subset of selected bands. Peaks may be used to spread wavelength selections out across the full spectral range. If only the weight magnitudes were used instead of peaks, a search technique would typically chose many wavelengths close to one another because neighboring bands are highly correlated. The ranked search module 905 zeroes (826) the normalized weights for the selected K peaks. Zeroing a weight allows new peaks and, therefore, bands to be chosen close to other bands that are already selected.

The ranked search module 905 repeats the foregoing, as shown in FIG. 10, until the ranked search module 905 determines (828) that the subset of selected bands is an "acceptable" set of bands. In some examples of the ranked search technique 805, the subset of selected bands having a specified number of wavebands is a good enough set of bands. In other examples, the subset of selected bands having a specified signal-to-clutter ratio or having a specified fraction of the total signal-to-clutter ratio for the full set of wavebands is a good enough set of bands.

The ranked search technique 805 is very fast in removing non-informative bands. Observations have shown that some examples of the ranked search technique 805 reduce a full band set (about 200 bands) to a third the number of bands (about 70 bands) without sacrificing much in detection performance. This reduction in bands significantly reduces processing in the subsequent band selection layers.

Figure 11:
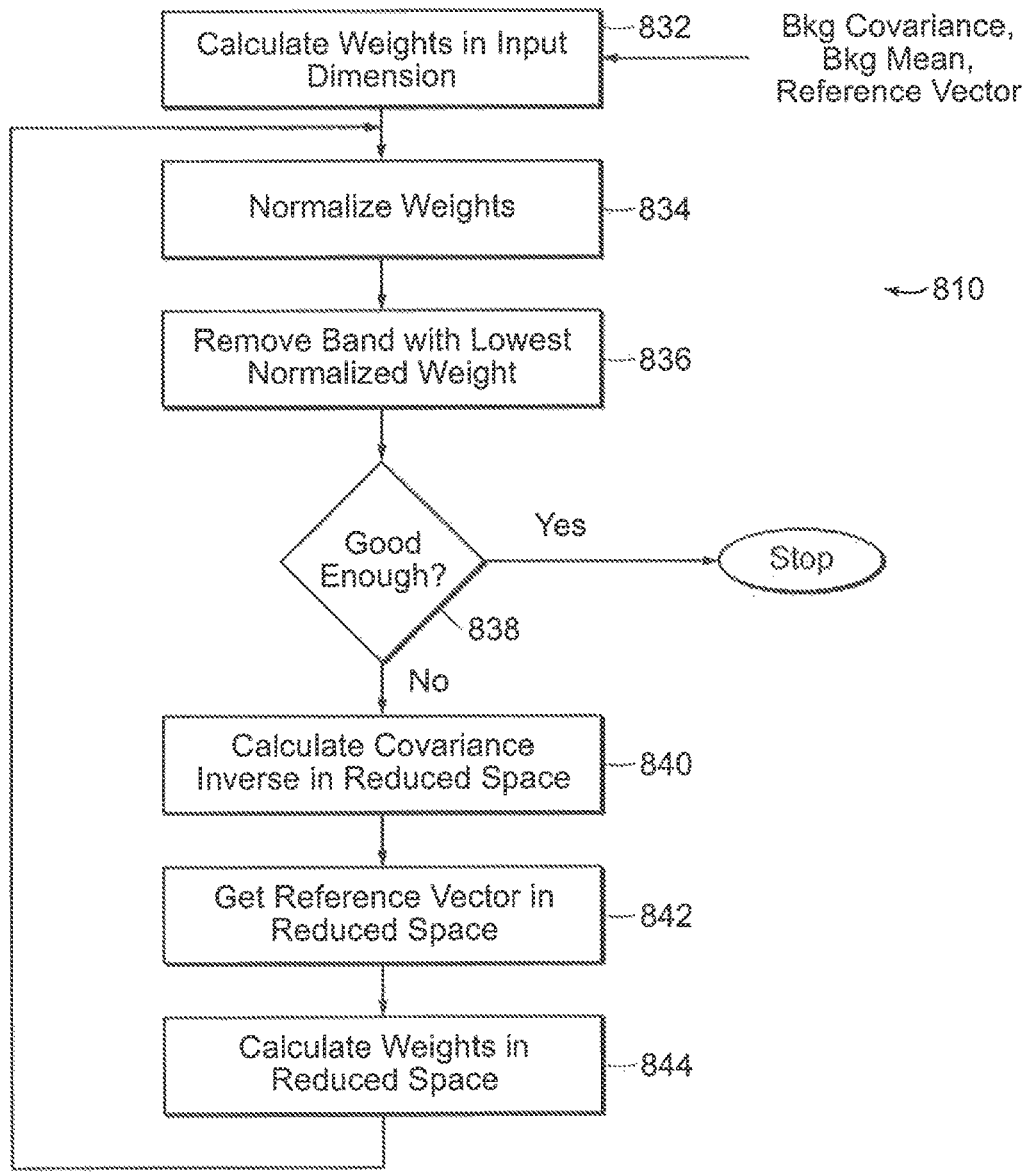
FIG. 11 is a flow chart of an example of a leave-one-out search technique.

FIG. 11 is shows an example of the leave-one-out search technique 810 executed by the leave-one-out search module 910 (as shown in FIG. 9). Operating in a "standalone" mode, inputs to the leave-one-out search module 910 may include a background mean vector and covariance matrix, target reference vector, algorithm control parameters, and the desired number of reduced bands. Operating in a "layered" mode, inputs to the leave-one-out search module 910 also include bands selected using the ranked search technique described above. In both modes, the leave-one-out search module 910 iterates removing one non-informative band at a time until the desired number is reached.

The leave-one-out search module 910 may calculate (832) matched filter weights in an input dimension using, for example, the standard matched filter equations known in the art (e.g., as described above). The leave-one-out search module 910 may normalize (834) the calculated weights in a manner similar to one described above in the ranked search technique 805. The leave-one-out search module 910 may remove (836) the band with the smallest normalized weight magnitude resulting in a reduced set of bands.

The leave-one-out search module 910 repeats the foregoing until the leave-one-out search module 910 determines (838) that the reduced set of bands is an "acceptable" set of bands. In some examples of the leave-one-out search technique 810, the reduced set of bands having a specified number of wavebands is a good enough set of bands. In other examples, the reduced set of bands having a specified signal-to-clutter ratio or having a specified fraction of the total signal-to-clutter ratio for the full set of wavebands is a good enough set of bands.

Having not determined an acceptable set of bands at 828, the leave-one-out search module 910 may calculate (840) the covariance inverse of the reduced set of bands (i.e., the leave-one-out search module 910 the calculation in reduced space). Typically, each weight calculation requires a matrix inversion that is O(N**3) operations where N is the dimension of the matrix to be inverted. Examples of the leave-one-out search technique 810 significantly reduced the number of computations. At each iteration of the leave-one-out search technique 810, the covariance matrix to be inverted differs by one row and column (for the band to be removed) from the covariance matrix inverted previously.

Figure 12A:
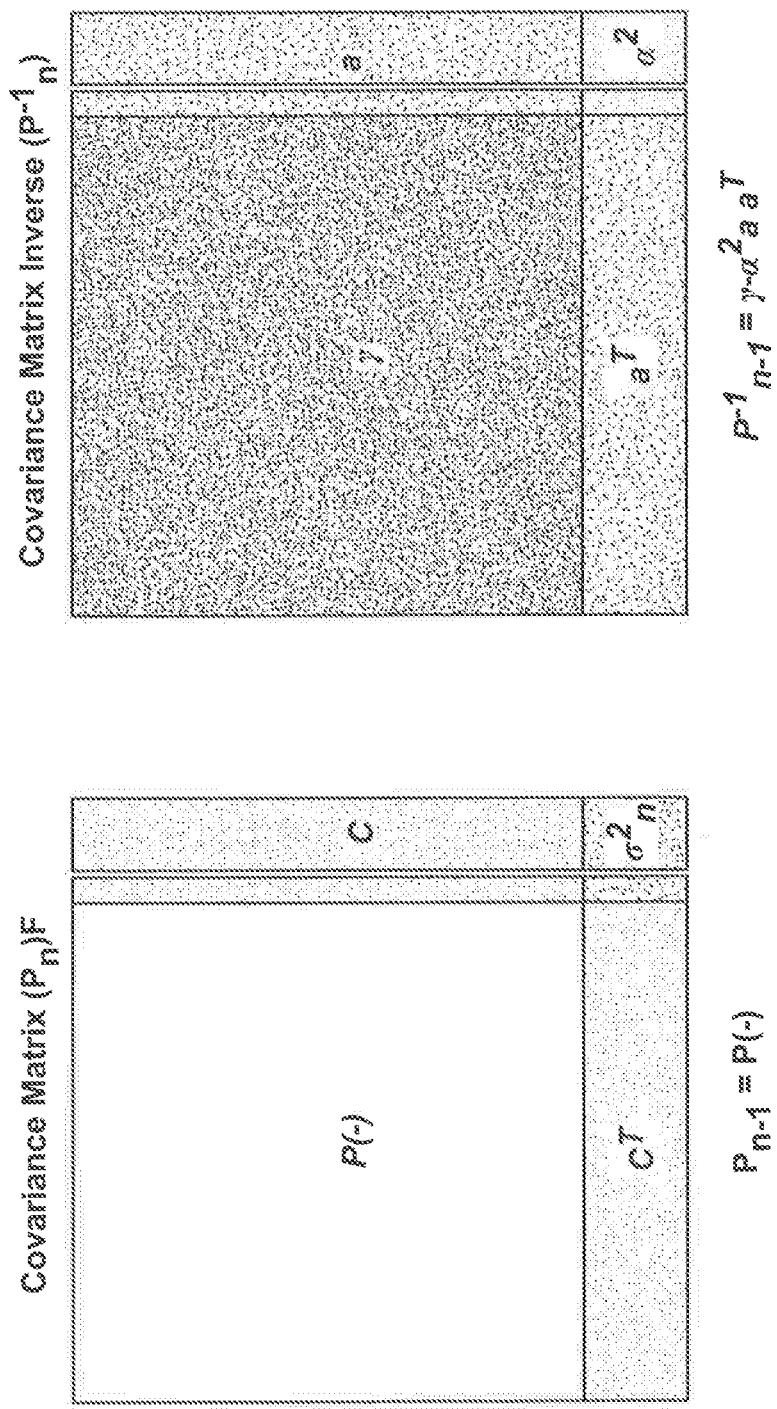
FIGS. 12A and 12B are block diagrams relating to the example of the leave-one-out search technique of FIG. 11.

FIG. 12A gives an example in which a new covariance matrix may be formed from the old covariance matrix after the last row and column are removed, which is equivalent to removing the last band. In the figure, the given equation shows the new inverse matrix being calculated in O(N2) operations given the old inverse matrix. In contrast, without any knowledge of the old inverse matrix, the new inverse matrix is computed in O(N3) operations.

Returning to FIG. 11, the leave-one-out search module 910 may iterate the leave-one-out search technique 810 by re-computing (844) the matched filter weights of bands in the reduced set of bands and repeating the foregoing as shown in FIG. 11. The reference vector in reduced space may be formed (842) by removing the value in the band that was removed above.

Figure 12B:
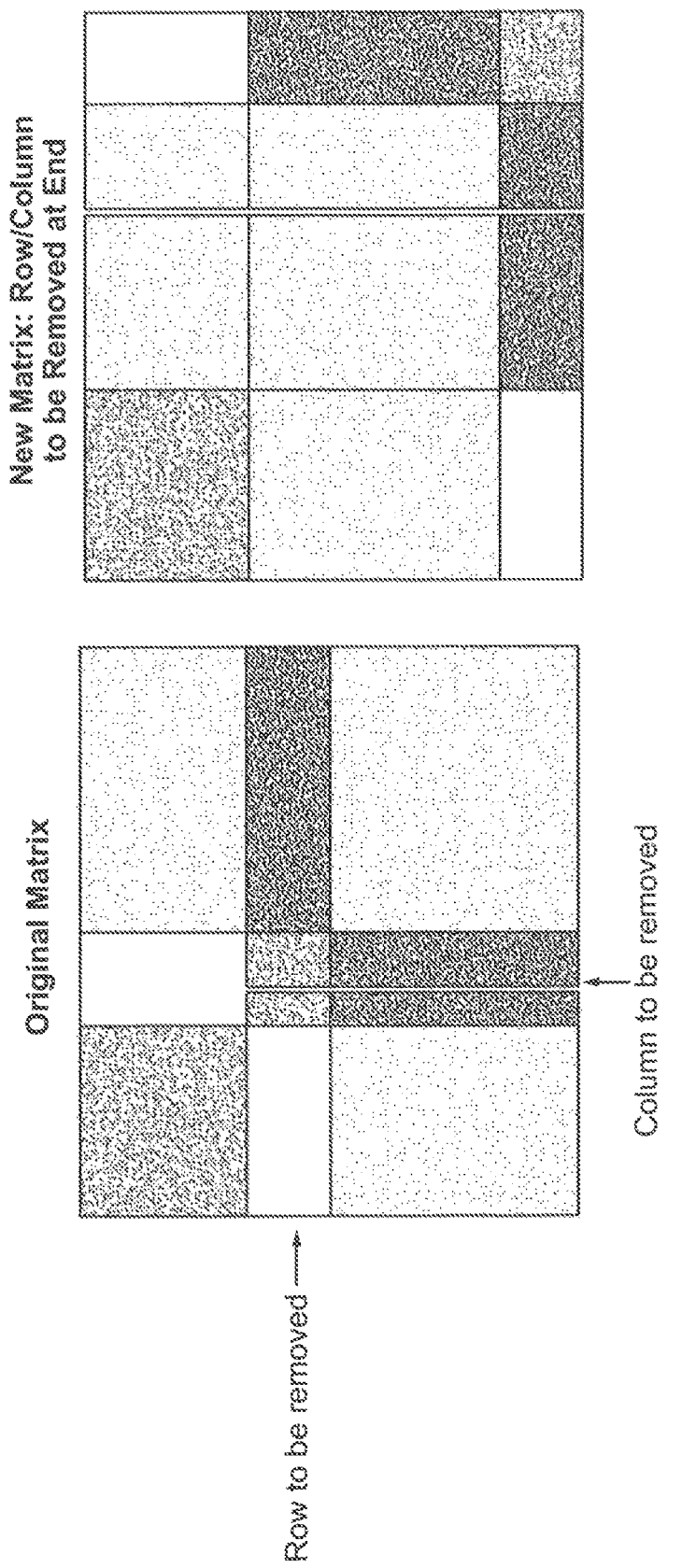

A convenient example of the leave-one-out search technique 810 may remove an arbitrary band in two steps. The leave-one-out search module 910 may rearrange covariance and covariance inverse using elementary row and column operations as shown in FIG. 12B. The correlations and variance of the band being removed are placed in the last row and column. The leave-one-out search module 910 then computes the new inverse as shown in FIG. 12A. The foregoing example of the leave-one-out search technique 810 allows for all bands to be ranked (reduced) in O(N3) operations because there could be N reductions with each taking O(N2) operations.

An example of the variable search module 915 may select K bands from the subset of bands that are outputted from the leave-one-out search module 910. The variable search module 915 may attempt to optimize the SCR for a reference vector against the observed background. Note, the SCR for a selected band set can be computed directly from the covariance matrix, background mean and reference vector. One of the advantages to using the SCR as an evaluation criterion is that a set of bands can be evaluated without having to process all pixels and can be computed quickly.

In general, the variable search technique 815 may run in two modes. The variable search technique 815 can perform "forward" selection where it starts off with no bands (or a few seeded bands) and then continues to add and subtract bands until an "acceptability" condition is satisfied, e.g., a desired number of bands is reached. Or the variable search technique 815 is able to perform backwards selection where it is initialized with all bands and then proceed to remove and add bands until a desired number of selected band is reached. Both backward and forward selections have been tested on spectral cubes and both searches produced similar results. Therefore, a convenient example of the variable search technique 815 used in the layered approach 800 is forward selection because it takes fewer computations.

Figure 13:
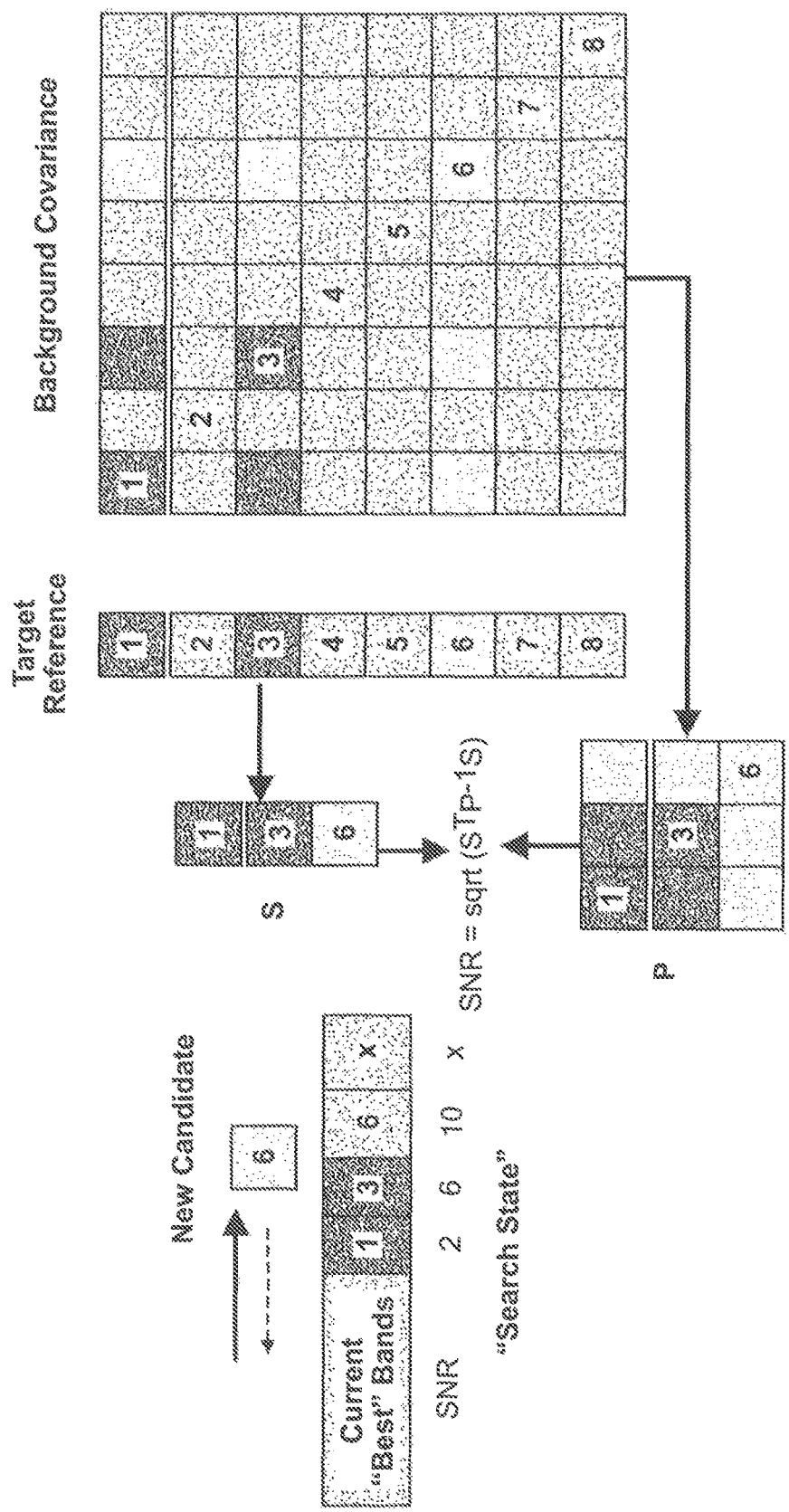
FIG. 13 is a block diagram of an example of a variable search technique.

FIG. 13 shows an example of the variable search technique 815 during the search for the "best" third band. At the point illustrated in the figure, the three bands that provide the highest SCR are bands 1, 3 and 5. The three bands combined produce a SCR of 10. The variable search module 915 determines if there is a better third band than band 5 by evaluating bands 6 thru 8 in place of band 5 in sequence. For each combination, the appropriate covariance elements are taken from the larger covariance matrix (e.g., input from the Leave-one-out Method) as well as the appropriate target reference elements.

The variable search module 915 may take the appropriate covariance from the larger covariance matrix (e.g., input from the leave-one-out search module 910) as well as the appropriate target reference elements. The variable search module 915 calculates the matched filter SCR using, for example, a MF equation.

After trying all bands, the variable search module 915 may store the three band combination that produces the highest (combined) SCR. For example, assume the SCR after trying bands 6 through 8 are all less than 10, then bands 1, 3 and 5 remain the "best" three band combination.

Note that the SCR calculation involves the inverse of the smaller covariance matrix, which is computationally intensive. In a convenient example of the variable search technique 815, the computations may be sped up significantly by noting that the covariance of a new band set under evaluation is just one band different from the last one. Knowledge of the previous inverse dramatically reduces computations.

After evaluating all three band combinations, the variable search module 915 may perform "backtracking". For example, the variable search module 915 may ignore band 3 and the variable search module 915 may compute the SCR for two-band combination of bands 1 and 5 (band 5 being just determined to be part of the "best" three band combination).

If that SCR is higher than the "best" previous two-band combination (1 and 3), the variable search module 915 may remove band 3 from the feature list.

A convenient example of the variable search module 915 saves the SCR for the previous "best" two-band combinations and it does not need to be recomputed. Backtracking looks at all the previously selected bands to see which should be eliminated. Note that a band that is eliminated could be added back later in the search. After backtracking, the variable search module 915 may add another band and the process is repeated until the desired number of bands is reached.

MSI Cueing and Detection

With reference again to FIG. 7, MSI target filter module 702 of filtering module 160 may output the set of N MSI filter pass bands 704 to a TOF control module 706 in the form of commands that control the operation of N TOFs 115 (shown in FIG. 1). TOFs 115 may tune the MSI detector array 117 (shown in FIG. 1) such that MSI data acquisition module 710 acquires MSI scene data 712 in the N pass bands 704. This may be effected through commands to limit the set of MSI wavebands in which scene data may be acquired to the N MSI filter pass bands 704.

The acquired MSI scene data 712 may be atmospherically corrected, at conversion module 714, if necessary, using the atmospheric characterization data derived by atmosphere characterization module 606, which represents a radiance measurement containing scene radiation reflected from surfaces, bounced in from neighboring pixels, and reflected from the atmosphere and the sun, into a reflectance image from which materials may be identified from their reflectance spectra.

MSI target detecting module 716 may then attempt to detect the one or more targets in the acquired MSI scene reflectance. MSI target detecting module 716 may compute the N-band MF and/or ACE scores for each potential target having a MSI target detection score above a selected or predefined threshold. The N-band MF and/or N-band ACE detection filters may use the N rows and columns of the covariance matrix corresponding to the best N bands or the covariance may be re-computed from the MSI scene data. This may or may not result in confirmation(s) of the detection(s) of target(s) indicated by HSI detector module 612.

Optionally, the N-band MF and ACE scores computed by MSI target detecting module 716 may be combined, weighted by a computed efficiency for a filter combination of particular targets and associated spectral covariance(s).

In the event that HSI detector module 612 indicates that no targets were detected in the HSI sensor data 602, then MSI target filter module 702 may compute the N MSI pass bands 704 for tuning TOFs 115 using the clutter characterization and band selection for targets in the spectral library 618, similarly using a number of known techniques. In a non-limiting example, MSI target filter module 702 may compute N MSI pass bands 704 by applying the filtering process described above (and in the inventor's previously incorporated by reference '915 patent), utilizing the computed scene spectral covariance (from covariance computation module 608) and the atmospheric transmission and path radiance (from characterization module 606), to a set of spectral wavebands retrieved from spectral library 618 and associated with known potential targets.

The N MSI pass bands 704 may have an acceptable SCR representing a probability of detecting the spectral library target(s) in the MSI scene imagery. The target spectra in the spectral library 618 may be associated with higher priority targets in a prioritized list of targets.

In an alternative embodiment, the N MSI pass bands 704 may be computed by assigning the N pass bands 704 to the spectral wavebands associated with known potential targets retrieved from the spectral library 618, without additional best band (e.g., filtering, etc.) computations. The N MSI pass bands 704, in such an embodiment, may be similarly output to TOF control module 706, which then tunes the N TOFs 115 such that MSI detector array 117 acquires MSI data in the optimal pass bands.

Processing steps for N-band tuning (706), MSI data acquisition (710), reflectance conversion (714) and MSI target detection (718), after computation of the N MSI pass bands, for the situation wherein no HSI targets were detected in the HSI sensor data 602 may proceed as described above for the case where targets were detectable in the HSI scene data 602, except that there are obviously no HSI target detections needing confirmation.

Alternative Embodiments

Numerous variations in the processes described above are possible. For example, the N best pass bands may be computed to detect a single target, or may comprise multiple subsets of wavebands, computed such that each subset enables detection of one of multiple targets. In yet other embodiments, the N MSI pass bands may comprise a mix of bands optimized to detect multiple targets.

In another embodiment, after detecting a first target with the MSI detector array 117 tuned (cued) to a first set of N MSI pass bands 704, the image processor 100 may compute a second set of N best bands, and retune the MSI detector array 117 to detect a second target.

Optionally, the MSI detector array 117 may produce image chips that may be used by image processor 100 to assess the shape(s) of the detected target(s).

MSI target detecting module 716 may apply known time delay and integration (TDI) techniques during tuned MSI data acquisition in order to increase the signal to noise ratio of the acquired MSI data. In such embodiments, a TDI data acquisition step (not shown) performed by a focal plane designed to acquire TDI data may occur prior to the target detection.

Experimental Results

In order to assess the performance of the process of HSI target detection using N MSI filter pass bands, 132 materials were tested using 10, 15 and 20 best HSI pass bands computed as described above using measured HSI scene data. The utilized HSI sensor and MSI sensor shared a 1 m common aperture telescope mounted on a platform in orbit at 500 Km, so HSI sensor had a GSD of 4 m, and MSI had GSD of 1 m. The HSI sensor had a full set of 256 bands from 0.4-2.4 um, F/3, 24 um pitch. The MSI sensor had 10 available bands, each having 16 TDI, F/12, and 8 um pitch. The HSI and MSI sensors shared a common aperture of a 1 m telescope. It was determined that using 20 bands of a full set of 256 bands provided 80%-95% of target detections yielded using the full spectrum. Using the 10 best bands provided 81% of target detections yielded using the full spectrum. Using the same telescope, the HSI sensor was able to detect targets of ~4 $m^2$, while the MSI sensor was able to detect targets of about 0.4 $m^2$ (which would otherwise require an HSI sensor having an aperture>3 m.)

The above-described systems and methods may be implemented in digital electronic circuitry, in computer hardware, firmware, and/or software, e.g., in imaging system 102. The implementation may comprise a computer program product (i.e., a computer program tangibly fixed in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit in image processor 100 suitable for use in a computing environment to carry out the features and functions of various examples discussed herein. A computer program can be deployed to be executed on one computer or on multiple computers at one site (e.g., in imaging system 102).

Method steps or operations may be performed as processes by one or more programmable processors executing computer program instructions to perform functions of various examples by operating on input data and generating output. Method steps may also be performed by and an apparatus can be implemented as special purpose logic circuitry. The circuitry may, for example, be a field programmable gate array (FPGA) and/or an application specific integrated circuit (ASIC). Modules, subroutines, and software agents may refer to portions of the computer program, the processor, the special circuitry, software, and/or hardware that implements that functionality.

Cueing module 150 and detecting module 160 may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., cueing module 150 and detecting module 160) cause the one or more processors to carry out or implement the features and functionalities of various examples discussed herein.

Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component may, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device in imaging system 102 may include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., INTERNET EXPLORER® available from Microsoft Corporation, of Redmond, Wash.). The mobile computing device includes, for example, a BLACKBERRY® provided by Research In Motion Limited of Waterloo, Ontario, Canada.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for detecting a target within a scene with hyperspectral and multispectral imaging sensors, the method comprising:
    receiving, by one or more processors, hyperspectral imaging (HSI) scene data comprising an array of scene pixels collected by an HSI sensor, the HSI sensor acquiring the scene data in a set of spectral wavebands:
    characterizing, by the one or more processors, atmospheric transmission and path radiance from the HSI scene data,
    computing, by the one or more processors, N multispectral imaging (MSI) filter pass bands for detecting one or more targets based on the HSI scene data, and
    commanding, by the one or more processors, N tunable optical filters operably connected to a MSI sensor configured to image the scene to tune to the N MSI filter pass bands;
    applying the tuned N tunable optical filters to the MSI sensor;
    acquiring, by the one or more processors, radiance of the scene with the tuned MSI sensor and the tuned N tunable optical filters;
    converting, by the one or more processors, the acquired MSI scene radiance into a MSI reflectance using the characterization of the atmospheric transmission and path radiance; and
    applying, by the one or more processors, one or more target detection filters within the acquired MSI scene reflectance.

2. The method of claim 1, further comprising computing a prioritized target list using one or more operator selections and information associated with detections or lack of detections of one or more targets in the HSI data.

3. The method of claim 1, wherein:
    computing the N MSI filter pass bands comprises
    determining whether the one or more targets are detectable in the HSI scene data as having an HSI target detection score above a threshold, and
    for each HSI target detection score detected above the threshold, filtering, using the computed spectral covariance, the set of HSI wavebands to compute the N MSI filter pass bands as a reduced set of N HSI wavebands having an acceptable signal-to-clutter ratio (SCR) representing a probability of detecting the one or more targets in the HSI scene data; and
    if one or more targets are detected are detectable in the HSI scene data,
    tuning the tunable filters and computing the one or more target detection filters, and
    detecting the one or more targets in the acquired MSI scene reflectance comprises computing N-band MF or ACE scores for each target having a MSI target detection score above a threshold using the characterized atmospheric transmission and path radiance and the N-band MSI scene reflectance in order to confirm the detection of the one or more targets.

4. The method of claim 3, wherein determining whether the one or more targets are detectable in the HSI scene data further comprises applying Matched Filter (MF) or Adaptive Cosine Estimation (ACE) based on known target spectra within the HSI scene pixels.

5. The method of claim 3, wherein, if no HSI target detection scores are detected above the threshold, computing the N MSI filter pass bands comprises assigning the N MSI filter pass bands to be MSI wavebands associated with one or more targets selected from a spectral library.

6. The method of claim 3, further comprising selecting the N MSI filter pass bands for detection of multiple targets based on at least one of an average of computed SCR levels.

7. The method of claim 1, wherein computing the N MSI filter pass bands comprises:
    computing a spectral covariance of the scene pixels using HSI scene reflectance, and, using to compute the N MSI filter pass bands as a reduced set of N HSI wavebands having an acceptable SCR representing a probability of detecting in the scene one or more prioritized targets in a spectral library.

8. The method of claim 7, further comprising selecting the N MSI filter pass bands for detection of multiple targets based on at least one of an average of computed SCR levels.

9. The method of claim 1, wherein the one or more targets comprise multiple targets having respective sizes above a selected threshold.

10. The method of claim 1, wherein:
the one or more targets comprise multiple targets; and
the N MSI filter pass bands comprise subsets of wavebands, each subset computed to detect one of the multiple targets.

11. The method of claim 1, wherein the tunably filtered MSI sensor produces image chips for assessment of a corresponding one or more shape of the detected one or more targets.

12. The method of claim 1, wherein detecting the one or more targets within the acquired MSI scene reflectance comprises applying time delay and integration to the MSI scene data to increase an associated signal to noise ratio of the MSI scene data.

13. The method of claim 1, wherein the N MSI filter pass bands include from 5 to 20 wavebands, and the set of HSI wavebands include at least an order of magnitude more wavebands.

14. The method of claim 1, wherein the tunable optical filter is selected from the group of rapidly switching filters consisting of liquid crystals, mechanical filters, and MEMS filters.

15. The method of claim 1, further comprising, after detecting a first target with the MSI sensor tuned to a first set of wavebands, retuning the MSI sensor with the tunable optical filters to a second set of wavebands selected to detect a second target.

16. The method of claim 1, wherein the MSI sensor and the HSI sensor share a common aperture.

17. A system for detecting a target within a scene with hyperspectral and multispectral imaging sensors, comprising:
one or more processors configured to:
receive hyperspectral imaging (HSI) scene data comprising an array of scene pixels collected by an HSI sensor in a set of spectral wavebands,
characterize atmospheric transmission and path radiance from the HSI scene data,
compute N multispectral imaging (MSI) filter pass bands for detecting one or more targets based on the HSI scene data,
command N tunable optical filters operably connected to a MSI sensor sharing a common aperture with the HSI sensor to tune to the N MSI filter pass bands;
apply the tuned N tunable optical to the MSI sensor;
acquire radiance of the scene with the tuned MSI sensor and tuned N tunable optical filters;
convert the acquired MSI scene radiance into a MSI reflectance using the characterization of the atmospheric transmission and path radiance; and
apply one or more target detection filters within the acquired MSI scene reflectance.

18. The system of claim 17, wherein the one or more processors are further configured to compute a prioritized target list using one or more operator selections and information associated with detections or lack of detections of one or more targets in the HSI data.

19. The system of claim 17, wherein the one or more processors are further configured to:
compute a spectral covariance of the scene pixels using HSI scene reflectance,
determine whether the one or more targets are detectable in the HSI scene data as having an HSI target detection score above a threshold, and
for each HSI target detection score detected above the threshold, filter, using the computed spectral covariance, the set of HSI wavebands to compute the N MSI filter pass bands as a reduced set of N HSI wavebands having an acceptable signal-to-clutter ratio (SCR) representing a probability of detecting the one or more targets in the HSI scene data; and
if one or more targets are detected are detectable in the HSI scene data, tune the tunable optical filters, compute the one or more target detection filters, detect the one or more targets in the acquired MSI scene reflectance by computing N-band MF or ACE scores for each target having a MSI target detection score above a threshold using the characterized atmospheric transmission and path radiance and the N-band MSI scene reflectance in order to confirm the detection of the one or more targets.

20. The system of claim 19, wherein the one or more processors determine whether the one or more targets are detectable in the HSI scene data further by applying Matched Filter (MF) or Adaptive Cosine Estimation (ACE) based on known target spectra within the HSI scene pixels.

21. The system of claim 19, wherein the one or more processors are further configured to, if no HSI target detection scores are detected above the threshold, compute the N MSI filter pass bands by assigning the N MSI filter pass bands as MSI wavebands associated with one or more targets selected from a spectral library.

22. The system of claim 19, wherein the one or more processors are further configured to:
compute a spectral covariance of the scene pixels using HSI scene reflectance, and
filter, using the computed spectral covariance, the set of HSI wavebands to compute the N MSI filter pass bands as a reduced set of N HSI wavebands having an acceptable SCR representing a probability of detecting in the scene one or more prioritized targets in a spectral library.

23. A non-transient computer readable medium comprising program instructions, the program instructions when executed by one or more processors comprise instructions for:
receiving, by one or more processors, hyperspectral imaging (HSI) scene data comprising an array of scene pixels collected by an HSI sensor, the HSI sensor acquiring the scene data in a set of spectral wavebands:
characterizing, by the one or more processors, atmospheric transmission and path radiance from the HSI scene data,
computing, by the one or more processors, N multispectral imaging (MSI) filter pass bands for detecting one or more targets based on the characterized atmospheric transmission and path radiance, and
commanding, by the one or more processors, N tunable optical filters operably connected to a MSI sensor to tune to the N MSI filter pass bands;
applying the tuned N tunable optical filters to the MSI sensor;
acquiring, by the one or more processors, radiance of the scene with the tuned MSI sensor and the tuned N tunable optical filters;
converting, by the one or more processors, the acquired MSI scene radiance into a MSI reflectance using the characterization of the atmospheric transmission and path radiance; and applying, by the one or more processors, one or more target detection filters within the acquired MSI scene reflectance.

24. The non-transient computer readable medium of claim 23, wherein the program instructions further comprise instructions for:
   computing a spectral covariance of the scene pixels using HSI scene reflectance, and
   filtering, using the computed spectral covariance, the set of HSI wavebands to compute the N MSI filter pass bands as a reduced set of N HSI wavebands having an acceptable SCR representing a probability of detecting in the scene one or more prioritized targets in a spectral library.

* * * * *